US 8,226,495 B2

(12) United States Patent
Savarese et al.

(10) Patent No.: US 8,226,495 B2
(45) Date of Patent: Jul. 24, 2012

(54) GOLF DATA RECORDER WITH INTEGRATED MISSING CLUB REMINDER AND THEFT PREVENTION SYSTEM

(75) Inventors: Chris Savarese, Danville, CA (US); Noel H. C. Marshall, Gerringong (AU); Susan McGill, Redwood City, CA (US); Kenneth P. Gilliland, Petaluma, CA (US); Marvin L. Vickers, Quincy, CA (US)

(73) Assignee: Radar Corporation, San Ramon, CA (US)

( * ) Notice: Subject to any disclaimer, the term of this patent is extended or adjusted under 35 U.S.C. 154(b) by 190 days.

(21) Appl. No.: 12/405,223

(22) Filed: Mar. 16, 2009

(65) Prior Publication Data

US 2009/0233735 A1    Sep. 17, 2009

Related U.S. Application Data

(60) Provisional application No. 61/037,305, filed on Mar. 17, 2008.

(51) Int. Cl.
*G08B 13/14* (2006.01)
(52) U.S. Cl. ..................... 473/222; 340/568.6
(58) Field of Classification Search ...... 463/2; 473/222; 340/568.6
See application file for complete search history.

(56) References Cited

U.S. PATENT DOCUMENTS

| 3,226,704 A | 12/1965 | Petrash |
| 4,910,677 A | 3/1990 | Remedio et al. |
| 5,041,815 A | 8/1991 | Newton |
| 5,086,390 A | 2/1992 | Matthews |
| 5,127,044 A | 6/1992 | Bonito et al. |
| 5,283,733 A | 2/1994 | Colley |
| 5,298,904 A | 3/1994 | Olich |
| 5,305,998 A * | 4/1994 | Nesbit et al. .......... 473/481 |

(Continued)

FOREIGN PATENT DOCUMENTS

FR    2 875 109    3/2006

(Continued)

OTHER PUBLICATIONS

PCT Invitation to Pay Additional Fees and Where Applicable, Protest Fee (PCT Article 17(3)(a) and Rule 40.1 and 40.2(e)) for PCT/US2009/001698, Aug. 19, 2009, 8 pages.

(Continued)

*Primary Examiner* — Melba Bumgarner
*Assistant Examiner* — Syvila Weatherford
(74) *Attorney, Agent, or Firm* — Blakely, Sokoloff, Taylor & Zafman LLP

(57) ABSTRACT

Apparatuses, methods and systems relating to at least one or more of golf club reminding and golf data collecting and recording. In one embodiment an apparatus on a golf club includes an integrated reminder and a stroke cancellation system and is semi-automatic in that the recording of the stroke is directly in response to changing the state (e.g. activating) of a switch which indicates that the golfer has pressed a button on the golf club. The pressing of the button indicates that the golfer will or has taken a stroke with the golf club and that the stroke is to be recorded, with the location of the stroke and an identifier of the club (e.g. 9 iron). The system may also be equipped with a missing club reminder and theft prevention function that notifies the golfer is a golf club has been left behind or if a club or golf bag has been removed without authorization.

17 Claims, 27 Drawing Sheets

U.S. PATENT DOCUMENTS

| | | | |
|---|---|---|---|
| 5,507,485 | A | 4/1996 | Fisher |
| 5,565,845 | A | 10/1996 | Hara |
| 5,844,483 | A | 12/1998 | Boley |
| 5,952,921 | A | 9/1999 | Donnelly |
| 5,963,134 | A | 10/1999 | Bowers et al. |
| 5,973,596 | A | 10/1999 | French et al. |
| 6,023,225 | A | 2/2000 | Boley et al. |
| 6,030,109 | A | 2/2000 | Lobsenz |
| 6,057,762 | A | 5/2000 | Dusza |
| 6,118,376 | A | 9/2000 | Regester |
| 6,366,205 | B1 | 4/2002 | Sutphen |
| 6,377,175 | B1 | 4/2002 | Williams |
| 6,411,211 | B1 | 6/2002 | Boley et al. |
| 6,582,328 | B2 | 6/2003 | Kuta et al. |
| 6,705,942 | B1 | 3/2004 | Crook et al. |
| 6,753,778 | B2 * | 6/2004 | Kruger ............... 340/568.6 |
| 6,774,792 | B1 | 8/2004 | Williams |
| 6,908,404 | B1 | 6/2005 | Gard |
| 6,967,563 | B2 | 11/2005 | Bormaster |
| 7,004,848 | B2 | 2/2006 | Konow |
| 7,106,195 | B2 | 9/2006 | Keays |
| 7,118,498 | B2 | 10/2006 | Meadows et al. |
| 7,121,962 | B2 | 10/2006 | Reeves |
| 7,143,639 | B2 | 12/2006 | Gobush |
| 7,205,894 | B1 | 4/2007 | Savage |
| 2001/0045904 | A1 | 11/2001 | Silzer, Jr. |
| 2002/0004723 | A1 | 1/2002 | Meifu et al. |
| 2002/0177490 | A1 | 11/2002 | Yong et al. |
| 2002/0188359 | A1 | 12/2002 | Morse |
| 2003/0191547 | A1 | 10/2003 | Morse |
| 2004/0147329 | A1 | 7/2004 | Meadows et al. |
| 2005/0070375 | A1 | 3/2005 | Savarese et al. |
| 2005/0268704 | A1 | 12/2005 | Bissonnette et al. |
| 2005/0272516 | A1 | 12/2005 | Gobush |
| 2006/0178110 | A1 | 8/2006 | Nurminen et al. |
| 2006/0192679 | A1 * | 8/2006 | Buckley et al. ............... 340/618 |
| 2006/0270450 | A1 | 11/2006 | Garratt et al. |
| 2007/0008120 | A1 | 1/2007 | Smith et al. |
| 2007/0040683 | A1 * | 2/2007 | Oliver et al. ............... 340/572.1 |
| 2007/0129178 | A1 | 6/2007 | Reeves |
| 2007/0135237 | A1 | 6/2007 | Reeves |
| 2007/0171059 | A1 | 7/2007 | Pistilli |
| 2007/0182571 | A1 * | 8/2007 | Kennish et al. ............ 340/573.1 |
| 2007/0191126 | A1 | 8/2007 | Mandracken |
| 2009/0017944 | A1 | 1/2009 | Savarese et al. |
| 2009/0111602 | A1 | 4/2009 | Savarese et al. |

FOREIGN PATENT DOCUMENTS

| | | |
|---|---|---|
| GB | 2 440 027 | 1/2008 |
| JP | 2008-079965 A | 4/2008 |
| WO | WO 2008/038668 A | 4/2008 |
| WO | WO 2009/004391 A2 | 1/2009 |
| WO | WO 2009/004391 A3 | 1/2009 |

OTHER PUBLICATIONS

PCT International Search Report and Written Opinion for PCT Appln No. PCT/US2009/001698, mailed on Apr. 22, 2010 (22 pages).

PCT International Preliminary Report on Patentability for PCT Appln No. PCT/US2009/001698, mailed on Sep. 30, 2010 (14 pages).

PCT International Search Report and Written Opinion for PCT Appln No. PCT/US2010/038409, mailed on Dec. 21, 2010 (11 pages).

* cited by examiner

Figure 3A
Figure 3B
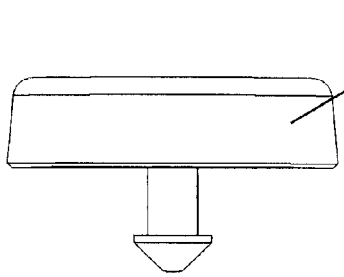
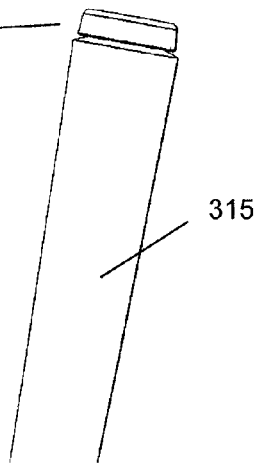
Figure 3C
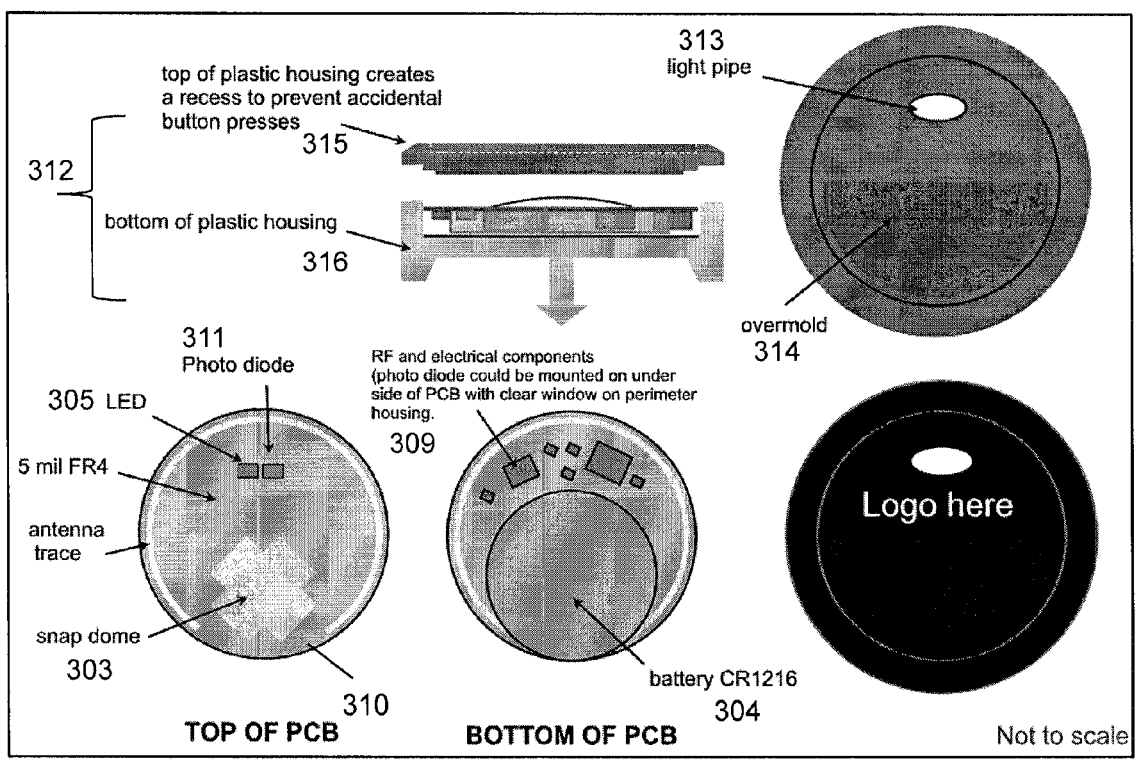

OPTION 3

WIRELESS INTERNET / USER INTERFACE DEVICE IN ONE HOUSING AND GPS/RFID DEVICE IN A SEPARATE HOUSING

NOTE: WITH THIS OPTION THE GOLFER COULD CHOOSE TO NOT WEAR (OR KEEP IN CLOSE RANGE) THE INTERNET DEVICE DURING PLAY.

INTERNAL MODULE

ANTENNA

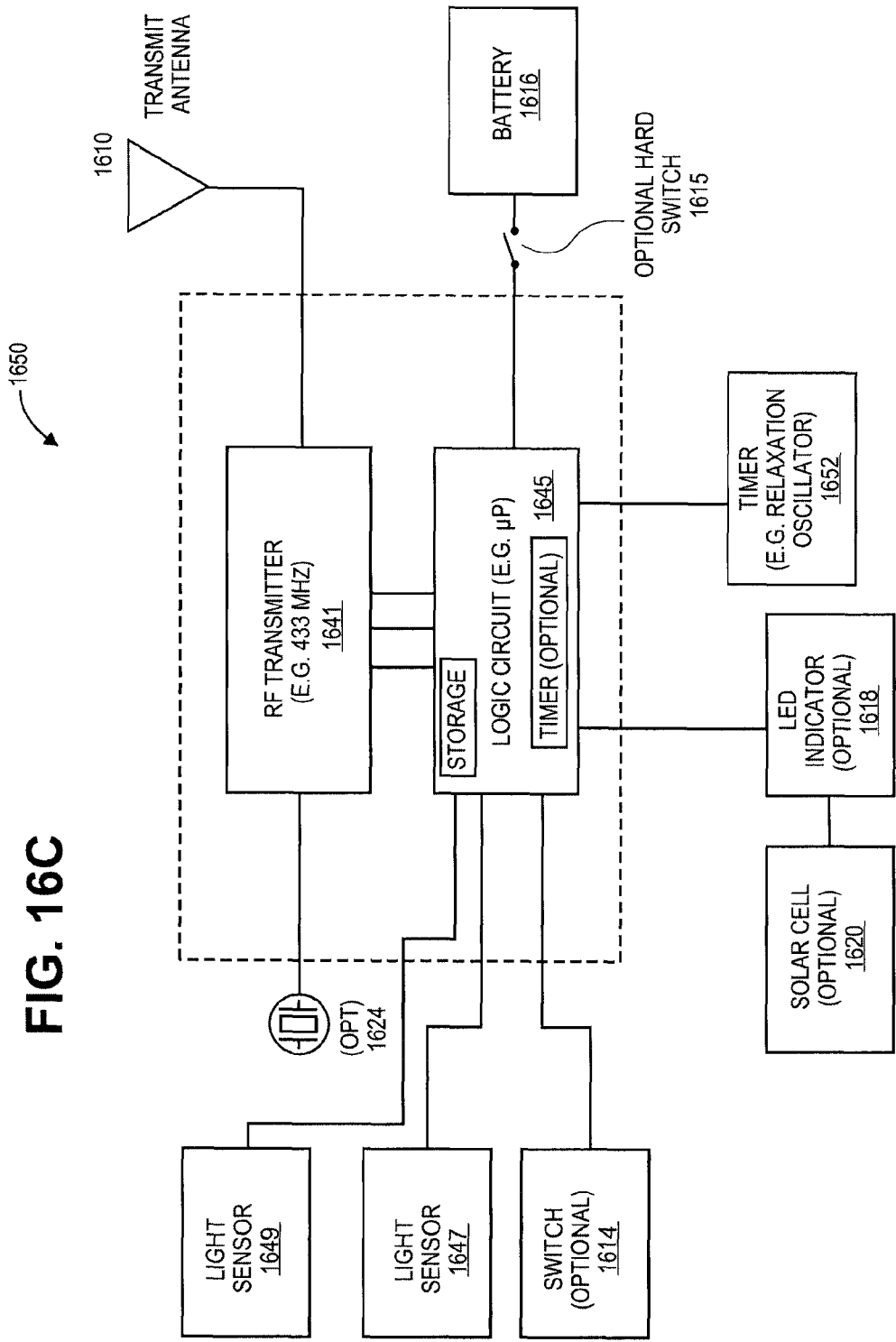

Figure 18A

Preparing to Use the System

| |
|---|
| Golfer purchases system. The parts of the system are 1) GPS and RFID device, 2) RFID tags for golf clubs. The parts could be sold separately or bundled in different configurations. In a preferred embodiment the device is sold bundled with the RFID tags, and the RFID tags are configured to communicate with that particular handheld. |
| ↓ |
| Golfer applies RFID tags to the golfer's clubs. The RFID tags are pre-coded with specific standard club names, for example "Driver" and "3-Iron". |
| ↓ |
| The handheld device recognizes RFID club tags provided and displays the list of golf clubs. The golfer may edit the name of any club. |
| ↓ |
| Golfer attaches the GPS and RFID device to the golfer's body, e.g. on the belt or in the front pocket in one embodiment of the device. |
| ↓ |
| The golfer turns on the device and proceeds to play golf. |

System In Use

Figure 18C

Preparing to Use the System

| Golfer purchases system. The parts of the system are 1) GPS and RFID device, 2) RFID tags for golf clubs. The parts could be sold separately or bundled in different configurations. In one embodiment, the RFID tags are supplied in a random manner, with no predetermined identifier. |
|---|

↓

| Golfer applies RFID tags to the golfer's clubs. The RFID tags are randomly coded. |
|---|

↓

| Each tag is initiated to the handheld device by holding the tag in close proximity to the device and activating the tag switch. Then handheld receives the ID code and prompts the golfer to enter information about this golf club. The handheld may provide a list of club names to choose from. Alternatively, the golfer may enter a custom name of the club with alpha-numeric characters selected on the handheld. |
|---|

↓

| Golfer attaches the GPS and RFID device to the golfer's body, e.g. on the belt or in the front pocket in one embodiment of the device. |
|---|

↓

| The golfer turns on the device and proceeds to play golf. |
|---|

GOLF DATA RECORDER WITH INTEGRATED MISSING CLUB REMINDER AND THEFT PREVENTION SYSTEM

RELATED APPLICATION

This application claims the benefit of the filing date of U.S. Provisional Application No. 61/037,305, filed Mar. 17, 2008, which is hereby incorporated herein by reference.

FIELD OF THE INVENTION

The present invention relates to the game of golf or other games, and more particularly to an improved golf data collecting and recording system and a system for reminding golfers when a club has been mistakenly left behind on the golf course and a system for notifying the golfer if a club or golf bag has been removed without authorization.

BACKGROUND OF THE INVENTION

Golf Data Recording Function

GPS rangefinders are popular in the game of golf. GPS rangefinders are used to inform the golfer of the golfer's location on a golf course relative to the location of other mapped areas of interest on the course (e.g. sand traps, greens, etc.) GPS rangefinders are typically available in either cart-mounted or handheld versions.

Examples of popular cart-mounted GPS rangefinder products include Prolink and UpLink. Examples of popular handheld GPS products include the SkyCaddie by SkyHawke and Golflogix, to name a few. A potentially valuable feature of handheld GPS rangefinders is the ability for the golfer to "mark the location" of the ball and other areas of interest. With existing handheld systems the golfer is able to press a button on the handheld devices to mark the location of the ball. Similar technology could be implemented in cart-mounted GPS systems, but the handheld systems have the advantage of the golfer being able to walk to the actual location of the golf ball to mark the location. Often golf carts are restricted to "cart path only" access on a golf course and it is often not practical to drive a golf cart to the actual location of a golf ball due to the terrain.

Marking the location of the ball provides valuable information to the golfer. The current handheld systems operate in approximately the following manner: When the golfer hits the first (tee) shot of a hole the golfer presses a button on the handheld device instructing the device to "mark the spot" where the drive was hit. The device records the GPS coordinates of the first shot. The golfer may manually enter, through a manual input interface, other information on the device such as: type of club used (e.g. driver, 5 iron, etc.), type of contact made with the ball (e.g. hook, slice, straight), wind conditions, etc. The current method to enter such data consists of the golfer making selections on the device by pressing buttons, selecting items from drop down menus, etc.

After the golfer hits the first shot, records the location of the first shot and enters data about the first shot the golfer approaches the ball at rest for the next shot. If the golfer follows the same pattern as the first shot (i.e. hitting the ball, marking the spot of the shot on the device, entering other information) the GPS system can store and display the locations of the first and second shots and calculate the distance of the first shot. If this pattern is continued for every shot of the round the golfer would have very valuable data about the golf round including: distance of all shots, locations of all shots and (if entered), type of contact made on all shots, wind conditions for all shots, etc. The golfer would also know the number of strokes taken per hole which (if accurately recorded) would be the golfer's score for the round. However golfers seldom use the features because the process of manually entering data is too labor intensive on a golf course and will lengthen the duration of each golf shot, causing delays in the game. Further, if a data collection system requires action by the golfer it is likely the golfer may forget to take action on every stroke. If the golfer forgets to take action to record a stroke or multiple strokes the system provides the golfer inaccurate data. Further, if the golfer attempts to return to the approximate location where the golfer forgot to record the golf stroke this would result in further slowing down of play which is bad for the game of golf. Patents exist that describe GPS systems with methods for collecting and managing data. Both U.S. Pat. No. 6,582,328 (Golflogix) and U.S. Pat. No. 7,118,498 (SkyHawke) describe such systems that require the golfer to enter golf shot data.

The problem with existing systems is golfers do not want to manually record the data for golf strokes into a handheld device. It is inconvenient for golfers to take the time to look at a handheld device, press buttons, select from drop-down lists, etc. to record information about every golf shot. One could say it is impractical for golfers to do so. Further, if golfers took the time to enter data in such a manual manner it would result in slower play which is not good for the golfers or the golf courses. It is desirable to have a completely automatic system for collecting golf data. U.S. Patent Application No. 60/949,458 describes such a system. The system described in this patent application includes means of detecting motion of the golf ball to confirm when an actual golf stroke has occurred. Such a system requires modification to the golf ball.

The problem of requiring the golfer to enter data manually is known. U.S. Pat. No. 7,121,962 and U.S. Patent Application Nos. 2007/0135237 and 2007/0129178 (all by Reeves) teach solving the problem using telemetry equipped golf clubs. The solutions taught by Reeves are impractical and fail to address all the issues required to accurately collect and record golf data. Reeves teaches entering data on a handheld device to record golf data, which is not good for the game because it would slow down play. Reeves teaches golf clubs with unique holes in or near the club head that make unique whistling sounds during the golf swing to identify each club. This approach is not practical due to variations in swing speed, wind and other noise variations that would make the system unreliable. Reeves teaches the use of a microphone housed in the handheld device to hear the clicking sound when the club hits to the ball to record the location of the stroke. This does not take into account practice shots between holes and other clicking sounds when clubs hit objects and would be prone to errors. Further, Reeves teaches requiring expensive and sophisticated electronics on the golf club (i.e. motion detector, and accelerometer). The expense of such components makes for an impractical solution.

U.S. Pat. No. 6,030,109 teaches a system for counting strokes automatically by detecting the distinctive sound made by a ball contacting the club face during a hit. The system disclosed seems to be problematic and potentially ineffective for several reasons. Similar to Reeves, this patent confirms a golf stroke by the sound made by the club striking the ball. Because golfers will often hit balls between holes for practice and hit other objects that might sound similar to hitting a ball the system will be prone to errors. A further potential problem relates to the insensitivity to a very gentle putt that generates no characteristic sound pattern. Finally, this system requires the golfer to wear an ankle strap with a microphone in it which golfers will likely not want to wear.

US Patent Application No. 2006/0270450 teaches a voice activated system for collecting and recording golf data. This system requires action (verbal instruction) by the golfer for each golf action to be recorded. Therefore the system does not automatically record golf data. Golfers may not like having to speak instructions for every action to be recorded. Further, golfers may forget to verbally instruct the recording of golf strokes which could result in attempts to return to locations where data was not recorded, slowing down play.

U.S. Pat. No. 7,143,639 and US Patent Application No. 2005/0272516 teach a golf launch monitor that uses RFID tags in golf balls and golf clubs to automatically identify the clubs and balls and to trigger a camera-based launch monitor system. U.S. patent application Ser. No. 10/672,365, filed Sep. 26, 2003 teaches passive RFID in golf balls and the identifying of such golf balls by a RFID reader.

Other examples of related prior art for golf data collection and management systems include: U.S. Pat. Nos. 6,705,942, 5,086,390, 4,910,677, 5,127,044, 5,283,733, 5,298,904, 6,908,404 and US Patent Applications 2002/0177490, 2002/0004723, 2001/0045904, 2002/0188359, 2005/0268704, 2005/0272516 and 2004/0147329.

Golf data collection systems will provide golfers with rich data about their golf game but existing systems and systems taught in the prior art above have shortcomings or challenges. The systems described above require either: 1) a modification to the golf ball, 2) expensive and sophisticated electronics on the golf club, 3) the golfer remembering to take an action to record every golf stroke (without a reminder) and 4) the golfer wearing an ankle strap with a microphone in it which golfers will likely not want to wear. Some of the prior art systems have technical challenges, such as relying on sound made by the club striking the ball to record every stroke—which may not be technically feasible for all strokes, particularly putts.

Golf Club Reminder Function

A golfer will commonly remove more than one club from their golf bag when considering how to make an upcoming shot. The golfer does this because they may be unsure of which club to use on the next shot. It is more convenient to have several clubs in hand when deciding which club to use vs. having to walk back to the golf cart for additional clubs. After choosing the correct club to use, the golfer may place the other clubs on the ground. After making the shot, the golfer may select the putter and walk towards the hole to putt the ball and not realize that he/she has left one or more clubs behind. It may then take the golfer a long time to realize that he/she has forgotten the misplaced club. Having to backtrack and reclaim the forgotten clubs slows down the game, is frustrating and may disturb those playing around the golfer.

There are several known approaches to solving the problem of mistakenly leaving golf clubs behind. Such systems are described in various U.S. Pat. Nos. 7,205,894 (Savage); 7,106,195 (Keays); 6,976,563 (Bormaster); 6,753,778 (Kruger); 6,411,211 (Boley et al); 6,366,205 (Sutphen); 6,118,376 (Regester); 6,057,762 (Dusza); 6,023,225 (Boley et al); 5,973,596 (French et al); 5,952,921 (Donnelly); 5,844,483 (Boley) and 5,565,845 (Hara) and U.S. Patent Application 2007/0191126 (Mandracken).

Some of these systems use distance between tagged clubs and readers to alert the golfer of a misplaced club; some use interrogating RFID transceivers mounted on the bag; some use loops around the opening of the golf bag that sense magnets passing through the loop and some use orientation sensors on the golf clubs. These systems may not be practical or effective for several reasons including: requirement of complex and expensive electronics in some cases; requirement of large amounts of power in some cases; potentially inadequate means of alerting the golfer in some cases. Therefore, there is need for a system that is inexpensive, does not require large amounts of power and effectively alerts the golfer when a club has been mistakenly left behind.

Theft Prevention Function

Golf equipment, specifically golf clubs and golf bags, can be very expensive. It is a known problem that golf equipment can be stolen. Often, when golfers finish playing a round of golf they will leave their golf equipment near the clubhouse, unattended, while they eat a meal, review their golf round with friends, etc. There is a need for a system that will notify a golfer when his or her golf equipment is moved without their authorization. Ideally, such system will help the golfer retrieve their golf equipment if stolen.

There are known approaches to solving the problem of alerting the golfer when their golf bag is moved without authorization. Such systems are described in U.S. Pat. Nos. 7,205,894 (Savage) and 5,041,815 (Newton). There is a need for a system with improved functionality over the known art.

SUMMARY OF THE DESCRIPTION

Apparatuses, methods and systems relating to semi-automatic golf data collecting & recording which may be combined with a system for reminding the golfer that a golf club (or clubs) has been mistakenly left behind or moved or removed without authorization are described herein. In one embodiment, RFID-enabled golf clubs including stroke recording reminder operatively coupled to a golf GPS (Global Positioning System or other satellite positioning system) device with an integrated RFID receiver allowing for semi-automatic recording of when and where golf strokes occur.

There is a need for a system that overcomes problems with prior systems. A golf data recording system in one embodiment that does not require modification to the ball and includes inexpensive and simple electronics on the golf club is described herein. The system in one embodiment includes a reminder for the golfer to take an action for each stroke. The system, in one embodiment, does not require the golfer to enter data on a handheld device (e.g. a handheld GPS device). The system does not require the golfer to wear a microphone strapped to the ankle. The system allows the golfer to manually confirm the location of the golf stroke and the club being used for the stroke by pressing a button on the golf club. The system will provide reliable data without slowing down the game. The system may also incorporate a missing club reminder to notify the golfer if a golf club has been left behind. The system makes use of the change of state from light to darkness when a golf club is in or out of a golf bag combined with a coded transmission from a RFID tag on each club to a receiver unit (handheld or golf bag mounted) as the basis of a club reminder system. The system may also incorporate a theft alert system if a club is removed from the golf bag without authorization or if the golf bag is removed from the immediate area. Hence one system may provide the combined capability of a golf data collection system and a golf club reminder system and a theft alert system or a subset of these capabilities, and such a system may be implemented in a handheld form factor (along with RFID tags in the golf clubs) or a golf bag mounted device.

In one exemplary embodiment of an aspect of the invention, a GPS device is coupled with a RFID receiver or transceiver. Active RFID-tagged golf clubs communicate wirelessly with the GPS/RFID device (in a handheld or golf bag mounted form factor) allowing for accurate recording of golf data and tracking of missing clubs.

A handheld GPS unit, in one embodiment, has, in addition to a GPS receiver, a RFID receiver or transceiver integrated within the same housing. The handheld unit can be worn by the golfer on a belt clip. It can be small enough to be stored in, for example, the front pants pocket. It could also be stored near enough to the golfer to record approximate location of golf strokes. For example, the golfer could clip the device to the golf carry bag or golf cart.

Golf clubs are equipped, in one embodiment, with active RFID tags. Each tag includes a switch (i.e. push button or membrane switch), a power source, RF transmitter, an antenna and a micro-processor with the ability to store a code describing the type of club.

When the golfer has selected his club and is ready to take a stroke, the golfer presses the button on the club tag. The tag transmits a signal to the integrated GPS & RFID unit to: 1) mark the location, and 2) record the club code, and 3) record the golf stroke. In one exemplary embodiment of an aspect of the invention, each golf club tag includes at least one way of reminding the golfer to record the golfer's location and club selection before executing the golf stroke. For example, each tag has a visual indicator (e.g. a light emitting diode/LED or liquid crystal display/LCD) coupled to a small photovoltaic (solar) cell. The solar cell provides power to the LED. When the golf club is removed from the golf bag and exposed to the light the LED illuminates or blinks. The golfer must press the button on the tag to turn off the LED.

In an additional embodiment, the golfer can choose the option of how the LED illuminates, by blinking or continuously on, or off. In one embodiment, the golf club tag can be an adhesive label attached to the shaft of the golf club below the grip. In yet another embodiment, the golf club tag can be located at the butt-end of the golf club grip and either be equipped with a means of reminding the golfer to press the button or not. The club tag may include a photo-transistor or solar cell capable of illuminating a visible reminder as described herein or the tag may not have a reminder built in. The golfer may be more apt to see a reminder placed under the grip of the club. The butt-end golf club tags may be sold to golfers with separate reminder "stickers" that can be applied to the clubs under the grips to give the golfer a visual cue and reminder to press the button. In one embodiment of an aspect of the invention, a golfer will press the button on the golf club tag which will trigger the tag to transmit its code, which is associated with the particular club, to identify the club to the receiving unit. This may be followed by an illumination of a LED on the club tag providing the golfer with confirmation that the club tag button was successfully pressed. Further, in the receiving unit (either handheld or bag mounted) there can be cues to the golfer that the transmission of the code was received. For example, the receiving unit can display a message, vibrate or provide an audible confirmation of a received code.

In one exemplary embodiment of an aspect of the invention the active tag on the golf club is a circular disc with a post on the underside. This post is pushed into the hole in the grip on the butt-end of the golf club. The approximate size of the disc is 0.8 inches diameter and 0.2 inches tall, with the post being approximately 0.4 inches long and 0.1 inches diameter. The electronic components inside the tag include a RF transmitter, microprocessor, battery, antenna, and photo-detection circuit. The tag is configured with a means of exposing at least one photo-detector to light. For example, a clear plastic tube or strip of clear plastic may be included along the entire circumference of the tag. This clear plastic acts as a light tube to easily transmit light to the internal electronics, including the photo-detectors, for example photo-transistors or photo-diodes. There may also be a clear portion on the top of the tag, alternatively the entire top of the tag may be clear. There may be two photo-detectors mounted in different orientations in the tag to detect light in two directions. One detector faces the outside of the tag toward the edge of the circular disc. This detector would be activated by any light detected along the circular edge of the tag, enhanced by the clear plastic light tube along the circumference of the tag. An optional second photo-detector faces upward perpendicular to the circular disc. This detector would be activated by light detected from the top of the tag, enhanced by the clear opening at the top of the tag.

The fact that the club tag with push button is in this location on the golf club allows the golfer to record each stroke quickly and easily, without the need to look at a screen on a handheld device or push buttons on a handheld device. The action required to record the stroke on the club tag is very minimal compared to the actions required to record a stroke on a handheld device (e.g. a handheld GPS device). For example, if recording a golf stroke requires looking at a handheld device and pushing buttons (or making selections from drop down menus) the golfer has to: 1) remove a hand from the golf club grip, 2) reach for the handheld device which is either clipped to the belt, in the pocket, or nearby clipped to a golf bag, 3) look at the screen, 4) press a button, 5) replace the handheld device, 6) replace the hand on the golf club grip. With the club tag the golfer can keep one hand on the golf club grip and quickly press the button with the thumb or finger of the other hand.

In another embodiment, an apparatus for collecting golf data comprises a substrate to attach the apparatus to a golf club, a transmitter (e.g. an RFID device) coupled to the substrate, and a switch coupled to the transmitter. The substrate may include an adhesive on one side to allow a user to attach the apparatus to the golf club. The switch, when activated (e.g. its state, such as open or closed state, is changed), causes the transmitter to transmit a signal, directly in response to activation of the switch, which causes a golf data collection apparatus to record information that a stroke, using the golf club, was taken. The switch, when activated, can cause the recording of a stroke without requiring a separate ball hit detector such as a sound detector which detects the club hitting the ball. This apparatus may be supplied as part of a kit which includes several of these apparatuses, each intended for a separate golf club and each identifying, through a RFID, the corresponding golf club; the kit may further include a handheld golf data collection apparatus which wirelessly communicates with the transmitter by receiving signals from the transmitter. This apparatus may also include a display device, coupled to the substrate, to remind the golfer to activate the switch to record the stroke, and may also include a solar energy source coupled to the display device to provide power to the display device which may be an LED or LCD device. This apparatus may also include a battery coupled to the transmitter to provide power to the transmitter and may also include, in at least certain embodiments, logic (e.g. a processor) coupled to the switch and to the transmitter, which logic is configured to determine whether a user activation of the switch indicates that a stroke is to be recorded (e.g. a single, short activation/press of a button) or canceled (e.g. a press and hold in the pressed state for a relatively prolonged period of time). In at least certain embodiments, activation of the switch causes the display device to enter, for a period of time, a lower power state after the user activates the switch.

A missing club reminder function is achieved in one embodiment by a photo-detector in the golf club tag. When the golf club is removed from the bag, the tag recognizes that it is in light and out of the bag. When the golf club is returned to the bag, the tag recognizes that it is in darkness and inside the bag. This information is transmitted to a handheld or bag-mounted device, which tracks whether a club is in or out of the bag and alerts the golfer that a club is out of the bag for a predetermined amount of time.

The system records, in at least certain embodiments:
Location of all shots
Type of club used for all shots
Distance of shots for specific clubs (this may be determined by the handheld GPS unit which calculates the distance between stored locations)
Number of strokes taken per hole/round
Number of putts per hole/round
When a golf club is in or out of the golf bag
The location (e.g. in latitude and longitude) of where (and optionally when) an identified golf club was removed from the golf bag In one embodiment, the electronics in the tag are in the off-position until a change is detected on a pin of the microprocessor. When the button is pushed, the microprocessor turns on and directs the transmitter to transmit an identifier, such as a quasi-unique identifier of the golf club, plus the two bits of status information. The status information bits would be coded to communicate that this information is due to a button push, and is therefore golf data information. In this situation, the status information bits may be coded as, for example, "10". The receiver or transceiver recognizes that this is golf data information and directs the handheld to store the current location of the receiver and the type of golf club from the club identifier information. The microprocessor in the handheld tracks this information to provide golf round data to the golfer.

The golf data can be stored and analyzed over a round, year, or lifetime of golf. This information will be very valuable to the golfer.

For the missing club reminder system, the change in ambient light triggers a change on the microprocessor pin. The microprocessor turns on and directs the transmitter to transmit an identifier, such as a quasi-unique identifier of the golf club, plus the status information about whether the club is in light or darkness. The receiver or transceiver recognizes that this is club reminder information and tracks the status of the club as explained further herein.

One or more of the methods described herein may be performed by a portable golf data collection system 1501, shown in FIG. 15, which may include a memory, a location positioning system 1503 (which may be a GPS or other satellite positioning system receiver or a cellular radio communication system or a pseudolite receiver), a RF receiver 1507 and a processing system 1505. The system 1501 is one example of various different systems described herein. The location positioning system 1503 may include one or more antennas, such as antenna 1504, and may be a conventional GPS (global positioning system) receiver or other type of satellite positioning system receiver which receive positioning signals from satellites or pseudolites; in other embodiments, the location positioning system 1503 may be part of a cellular telephone positioning system which uses transmission times between cellular towers or basestations to determine the position of the cellular telephone positioning system. The memory (not shown in FIG. 15) is coupled to processing system 1505 to store data collected in the methods described herein, such as location of first golf stroke on hole #1 with club #X and location of second golf stroke on hole #2 with club #Y, or that club #X is out of the golf bag at time X and club #X is back in the golf bag at time Y. The processing system 1505 may also keep track of the time that golf clubs have been out of the golf bag and trigger an alarm, indicating a particular golf club may have been forgotten and left behind on the golf course, after a predetermined time threshold has been met. The memory may also store data representing a map or other two-dimensional position information about one or more golf courses, and this information may be used to help determine automatically when and where a golf stroke has occurred and hence record data, in the memory, about the golf stroke.

The RF receiver 1507 includes one or more antennas, such as antenna 1506, which is configured to receive, along with receiving circuitry within the RF receiver 1507, RF signals from an RF tag in a golf club, such as RF tag 1513 (which includes at least one antenna 1514) and optionally RF signals from at least one RF tag in a golf ball, such as RF tag 1511 (which includes at least one antenna 1512), also shown in FIGS. 2A and 2B. The RF receiver 1507 shown in FIG. 15 may also, in certain embodiments, be configured to locate a lost golf ball by detecting RF signals from the lost golf ball and measuring received signal strength of those RF signals in order to guide the golfer to the lost golf ball. Those RF signals may be from a harmonic radar tag described in other patent applications noted herein and assigned to Radar Golf or an active, battery powered RF tag or a non-harmonic passive RFID tag. The system 1501 may be manually switched into a golf ball finding mode in order to activate the finding system and to pause the golf data collection system's use or processing of RF signals. The processing system 1505 is coupled to both the location position system 1503, which may be a GPS receiver, and to the RF receiver 1507, which may be an RFID transceiver to receive identifier codes from one or more golf balls and to receive an identifier code from a RFID tag of a golf club.

The system may also include a missing club reminder function as described herein. The golf club reminder system can be incorporated into the golf data management system in various ways:

1) The active golf club tag communicates directly with a handheld unit (e.g. a GPS golf data unit) which can also be cart-mounted or carried by the golfer (e.g. worn on a belt).

2) The active golf club tag communicates with a portable unit that is mounted on the golf bag. This portable unit contains a RF receiver or transceiver to receive the golf club inventory information. This information is processed and tracked within the portable unit. The unit would issue an alarm if it is determined that a golf club has not been returned to the bag within a predetermined amount of time, for example 10 or 15 minutes. The alarm could be visual, audible, or vibratory. The alarm signal could also be transmitted via RF to the GPS golf data unit or other portable electronic device carried by the golfer.

3) The active golf club tag communicates with a portable unit that is mounted on the golf bag. This portable unit contains a RF receiver or transceiver to receive the golf club inventory information. This information is received by the golf bag-mounted device and further communicated to the GPS golf data unit (or other portable electronic device carried by the golfer). In this example the bag-mounted device acts as a repeater. This data transfer could be achieved using Bluetooth. Alternatively, this information could be transmitted on another RF frequency, for example 433 or 315 MHz. The GPS golf data unit would process and track this information and issue an alarm if it is determined that a golf club has not been returned to the bag within a predetermined amount of time, for example 10 minutes. The alarm could be visual, audible, or vibratory.

In any of these three ways, the system may operate according to the following method. A light sensor (e.g. photo-detector unit in a disc on the butt-end of the golf club) on the golf club detects a light transition (e.g. dark to light, which indicates the club has been removed from the golf bag, or light to dark, which indicates the club has been returned to the golf bag). In response to this detection of a light transition, an RFID tag on the golf club and coupled to the light sensor, transmits data (e.g. a code) identifying the particular club and data (e.g. a code) indicating the type of transition (e.g. dark to light or light to dark). These transmitted codes are then received by an RF receiver (e.g. an RF receiver in a handheld unit or a golf bag mounted unit, either of which may also include a GPS receiver, a processor, a display, and one or more input devices) which is coupled to a processor in the unit, and the RF receiver provides these transmitted codes to the processor in the unit which causes a timer, associated with the club identified by one of the codes (e.g. a club code), to change a timer state depending upon the received code which specifies the type of transition (e.g. dark to light or light to dark). For example, if the code for the type of transition indicates that the identified club was removed from the golf bag (e.g. a dark to light transition) then the change in timer state for the associated timer is, in one embodiment, to start the timer (which may count down from a value representing a predetermined time period or count up to a value representing a time) for that club identified by the club code. Each club may have its own timer. On the other hand, if the code for the type of transition indicates that the club was placed back in the golf bag (e.g. a light to dark transition), then the change in timer state is, in one embodiment, to stop the timer associated with the club identified by the club code. In one embodiment in which an out-of-bag code is "stamped" with a time (e.g. GPS time), the change in timer state can involve determining whether or not to continue to compare (or start to compare) the stamped time with the current time (provided by a local real-time clock or received GPS time). The processor can repeatedly (e.g. periodically) over time check the state of each timer associated with each club to determine whether or not to present an alert (e.g. cause an audible alarm to sound or display on a display device an alert that a golf club may be missing) to the golfer. For example, in one embodiment, the processor can cause an alert when a timer for a particular golf club reaches a value which indicates that the club has been out of the golf bag for at least a period of time such as a predetermined period of time (e.g. over 10 minutes). This alert reminds the golfer to check whether or not the golfer has misplaced or lost a golf club, and a user interface on the unit can allow a golfer to turn off the alert and thereby cause the timer to be reset. The processor is configured, in one embodiment, to maintain, at the same time, a plurality of timers, each associated with a particular identified golf club; for example, the processor can maintain a first timer (e.g. counting down to zero from 10 minutes) for a first identified club and can concurrently maintain a second timer (e.g. also counting down to zero from 10 minutes) for a second identified club which is different than the first identified club. The timers may be implemented entirely in software through program code, which configures the processor, or the timers may be implemented entirely in hardware which is coupled to the processor and/or the display device (or speaker) in the unit, or the timers may be implemented in a combination of hardware (e.g. a crystal oscillator) and software. The processor may also be shared, in at least certain embodiments, with a GPS golf data collection system and also with a golf bag theft alert system. For example, the processor may perform a club reminder function (e.g. through the use of the timers associated with each club) as well as collect data for each stroke with the various clubs while a game of golf is played and this processor may control the display device of the unit and may also control and communicate with a GPS receiver which can also be in the same unit. In those embodiments in which a GPS receiver is in the unit, the processor can record in a memory a location associated with each club which is indicated to have been removed from the golf bag; this location, derived from the GPS receiver when the light sensor, in the club, detects a change in state, can indicate the location of where the club was last placed when it was removed from the golf bag, thereby allowing a golfer to go directly to a specified location rather than forcing the golfer, in response to an alert of a possible missing golf club, to retrace a path through a golf course.

A golf club component, which is adapted to be coupled to a golf club, can provide missing club reminder functions in addition to (or without) providing golf data collection functions. In one embodiment, the golf club component includes a first light sensor which has an output and a RF (Radio Frequency) transmitter which is coupled to the output. The RF transmitter is configured to transmit one or more signals that indicate that a golf club has been removed from or replaced into a golf bag. These signals can include an identifier (e.g. RFID unique identifiers) for the golf club. These one or more signals are normally generated after the output from the first light sensor is processed in a logic circuit which can be a microprocessor or other processing logic such as a FPGA (Field Programmable Gate Array) or ASIC (Application Specific Integrated Circuit), etc. The logic circuit can be configured to determine whether a change in the output is sufficient enough to decide that the golf club has been removed from (or replaced into) the golf bag; if the change is sufficient, the logic circuit causes the RF transmitter to transmit the one or more signals to another device such as a golf club reminding device or a golf GPS rangefinder which includes missing club reminder functionality. In certain implementations, the golf club component can further include a second light sensor which is coupled to the logic circuit and which is configured to measure a light intensity and to provide one or more measurements of light intensity to the logic circuit. In those implementations which use two light sensors, one light sensor (e.g. a first light sensor) can be used to wake up a sleeping (low power mode) logic circuit and other circuitry (e.g. a timer) and another light sensor (second light sensor), and then the logic circuit can cause the second light sensor to take one or more measurements of light intensity and the logic circuit can process these measurements to determine whether to transmit a signal that a golf club has been removed from (or replaced into) a golf bag. If the second light sensor is making multiple measurements the timer can be used to wake up the logic circuit and the second light sensor in order to take another light measurement. After a period of time after the change in the output from the first light sensor, the logic circuit times out and places the golf club component in a low power sleep state, from which it can exit in response to a change in the output of the first light sensor which receives power in this low power sleep state.

In certain embodiments, the timer may be used to wake up the logic circuit and RF transmitter to retransmit the signal indicating that the golf club has been removed from (or replaced into) the golf bag.

In certain embodiments, the logic circuit can cause the RF transmitter to transmit data representing the light intensity measurements to another device such as a golf GPS rangefinder (or another device which includes a real time clock (RTC) to determine the time of day for the purpose of determining whether it is dawn or dusk); the another device can use GPS time or time from the RTC to determine the time of day (E.g. dusk, twilight or dawn) to determine how to interpret the light intensity measurement and thus to determine whether to present a message to a golfer that an identified club (identified by, for example, its RFID code) has been removed from a golf bag. In this embodiment, smaller light intensity changes from dark to light can be ignored during mid-day but are not ignored (and hence are treated as a club removal action) at dusk or dawn. In this embodiment, the decision or determination that a club has been removed from (or replaced into) the golf bag is performed at the GPS rangefinder or other device rather than in the tag on the golf club.

The system 1501 may further include a networked data processing system which is coupled to a network or to the Internet and may include input/output devices, such as buttons and a touch screen input device which is integrated with a display screen, such as an LCD display.

Optionally, the bag-mounted device could include a function to prevent theft of the golf bag and theft of one or more golf clubs.

The system 1501 may be integrated in one housing or may be separated into several (e.g. two) housings for attachment to different parts of a golfer or otherwise positioned as described herein.

BRIEF DESCRIPTION OF THE DRAWINGS

The present invention is illustrated by way of example and not limitation in the figures of the accompanying drawings in which like references indicate similar elements.

FIG. 3A shows a side view of one embodiment of the RFID club tag.

FIG. 3B shows a RFID tag on a golf club attached to the butt-end of the golf club.

FIG. 3C shows details of one embodiment of the RFID club tag.

FIG. 16C is a block diagram showing another embodiment of the circuitry included in a golf club tag.

FIG. 18A is a flow chart showing an example of a method for setting up a system to initialize the RFID tags to the handheld to semi-automatically collect golf data; FIG. 18C is a flow chart showing an example of a method for setting up a system to initialize random RFID tags to the handheld to semi-automatically collect golf data.

DETAILED DESCRIPTION

Figure 1A:
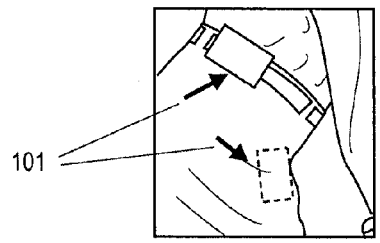
FIG. 1A shows an apparatus including a GPS receiver and RFID transceiver for collecting and recording golf data. The apparatus is shown clipped onto a golfer's belt or kept in the front pants pocket.
Figure 1B:
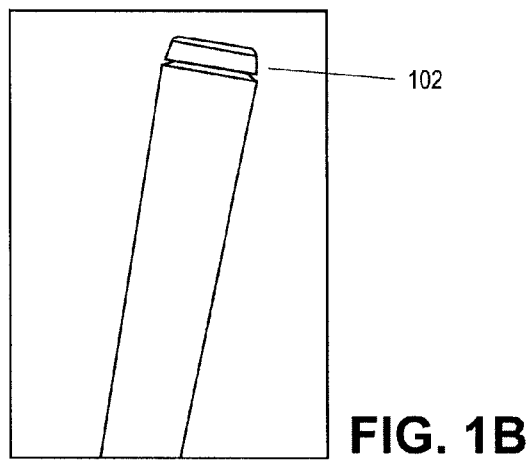
FIG. 1B shows a RFID tag on a golf club attached to the butt-end of the golf club.
Figure 2A:
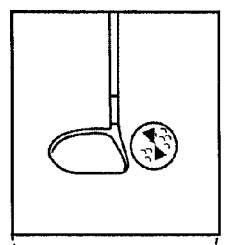
FIG. 2A shows a golf ball with indication that a RFID tag is inside the golf ball.
Figure 2B:
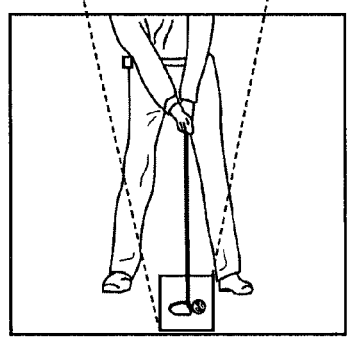
FIG. 2B shows a front view of a golfer addressing a golf ball with a RFID tag inside the golf ball.

The present invention, in one embodiment, is a golf data recorder and golf club reminding system that consists of a handheld device shown in FIG. 1A and RFID tags shown in FIG. 1B that are attached to a set of golf clubs. The handheld device 101 is a golf GPS device, such as the SkyCaddie, with additional functionality to communicate with the RFID tags 102. This system combines the GPS golfing and mapping technology of a golf GPS system with semi-automatic RFID tracking of golf equipment to provide data about a round of golf and a system for reminding the golfer if a golf club is mistakenly left behind. The system tracks information about a round of golf, such as the club used for each golf shot, and the location of each golf shot overlaid on a map of the golf hole and the number of strokes or score. The system also monitors when golf clubs are out of the golf bag and in the golf bag. If a golf club (or clubs) is out of the golf bag for longer than a predetermined amount of time (for example, 10 or 15 minutes) the system, in one embodiment, alerts the golfer. The system also alerts the golfer if a golf club is removed without authorization or if the golf bag is removed from a location.

One exemplary embodiment is shown in FIGS. 3A, 3B and 3C. A RFID tag 301 is attached to a golf club grip 315 at the butt-end of the grip. The RFID tag is made up of a power source, such as a battery 304, LED 305, switch 303, photo cell 311, and electronics 309 that include a RF transmitter, microprocessor, and antenna 310. The tag inserts into the vent hole at the butt-end of the golf club grip as shown in FIG. 3B. In FIG. 3C, the RFID tag is shown in cross section view as well as top and bottom views of the printed circuit board and two top views of the housing. The tag housing 312 includes a top portion 315 and a bottom portion 316. The housing can be made of plastic or other durable material to protect the electronics and to keep the tag from breaking when the tag hits the ground or the bottom of the golf bag. The top portion of the housing 315 has material higher around the perimeter of the top of the housing 315 in order to create a recess for the button used to record a golf stroke. The recessing of the button is important to eliminate accidental button presses and to prevent the button from being inadvertently pressed when the golfer replaces the golf club into the golf bag. A clear portion 313 is provided in the housing to allow light and darkness to be sensed by the photo cell 311 and to allow the LED 305 to be visible to the golfer. The housing is constructed is such a way to be water resistant or water proof to protect the electronics. The covering 314 for the switch (or button) 303 can be overmolding or plastic film, that provides flexibility and protection from dust, water, and mechanical shock.

Figure 5:
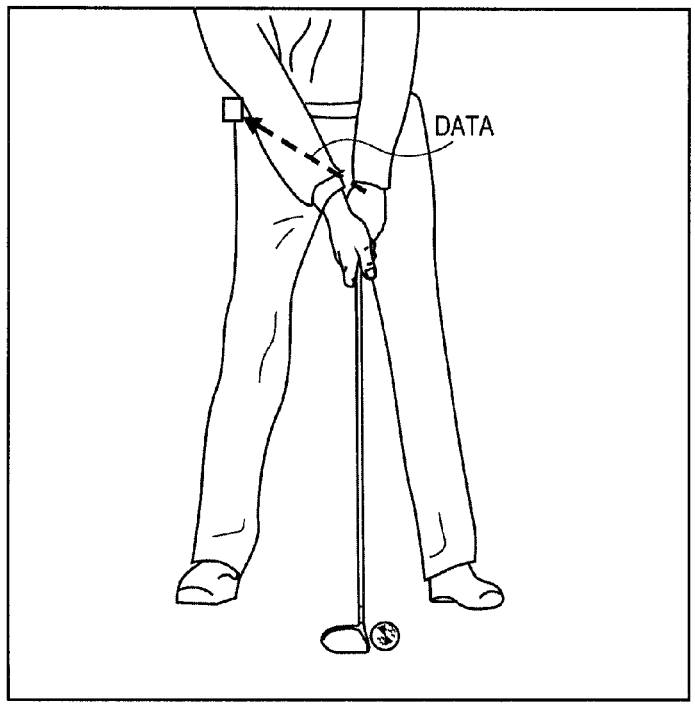
FIG. 5 shows a front view of a golfer wearing the apparatus and the apparatus receiving coded RF signals from the golf club tag (for data recording) and golf ball tag (for locating the ball).

The RFID tag is normally in the "off" position. When near the location of a golf stroke, the golfer presses the switch 303, which activates the electronics 309 in the tag. Upon activation, the tag transmits information to the handheld. This data communication is shown in FIG. 5. This communicated information includes club type and a command to mark the current location by GPS and a command to register a stroke. Optionally, there may be an audio, visual, or vibratory response from the handheld confirming receipt of tag information.

Alternatively, the RFID tag could be incorporated into the grip of the golf club or into the shaft of the golf club during manufacture of the golf club.

Club Tag Transmissions Displayed on the Receiving Device (e.g. Rangefinder) and Recorded Using Buttons on Receiving Device.

As an option to the golfer pushing the button on the club to record which club is being used for a golf stroke, the system can make use of the club tag status (reported by the light sensing switch) by displaying the club tag status on the receiving device. For example, when a club is removed from the golf bag and it transmits its "out of the bag" status the information can be displayed on a handheld device (e.g. rangefinder) and the golfer can press a button on the rangefinder to record the stroke location. If only one club is out of the bag at a time, and the club is symbol (e.g. "P" for "Putter") can be displayed on the device, the receiving device can be programmed to record the club as the club used for the stroke when the golfer presses a button on the receiving device to record the location of the stroke. If more than one club is out of the bag at one time the golfer could scroll up or down to highlight the club they will use for the golf stroke. The system can default to the middle club displayed to save button presses. For example, if the golfer has the 6, 7 and 8 irons out of the golf bag the receiving device can highlight the 7 iron (middle displayed) by default. The receiving device can be configured to either remove the displayed clubs from the screen after the club selection is made or the clubs that are "out" can remained displayed on the device until they are back "in".

Automatic Recording of Next Club Removed from Bag after Button Press on Rangefinder.

On some golf courses a golfer is allowed to drive the golf cart right up to the location of the golf ball—eliminating the need to carry one or more golf clubs to the location of the golf ball. On such courses where the golfer can drive to the ball location a typical sequence of events (for non-tee box shots) can be as follows:

1) Drive cart to ball
2) Check distance on rangefinder
3) Replace rangefinder on beltclip
4) Select a club for shot If the golfer is collecting golf data (and recording the data by pushing a button on the rangefinder) another step would be inserted after step 2. This step, step 2a, would be "Mark location". In one configuration of the golf data collection system, when the golfer presses the "Mark location" button (with all clubs still in the bag or not yet displayed on the rangefinder as being out of the bag) the golfer can be presented with a screen to easily select which club he plans to use.

The system could also be configured (and the golfer educated) that when the golfer presses the "Mark location" button (with all clubs still in the bag or not yet displayed on the rangefinder as being out of the bag) the golfer can be presented with a screen to select the golf club to be used but the golfer does not need to make a selection. The system can be configured to automatically record the next club the golfer removes from the bag (after pressing the "Mark location" button) as the club which is used to take a stroke at the location marked with the "mark location" button.

Other Switching Configurations in the Club Tags.

There are many possible configurations that make use of light sensors in the club tags, including:

Single light sensor configured as a switch. This approach can work but may place restrictions on the use of translucent or semi-translucent golf bags. For example, if a golfer owns a translucent golf bag and wants to use a system with tags configured with only a single light switch, the golfer could make the golf bag darker inside by using golf divider tubes for example.

Single light sensor configured as a meter. By combining a light meter with a relaxation oscillator on the tag the tag could be configured to continually take periodic light meter readings. FIG. 16C shows an example of such a tag. When a significant change in light in either direction is recorded the tag could report such data.

Dual light sensors configured as switches. One light sensor on the tag could be configured to have high sensitivity (e.g. a first light sensor of FIG. 16C) and one to have low sensitivity (e.g. a second light sensor of FIG. 16C). These sensors could report their switching data to a receiving device and if the receiving device has information about outside light levels (either an on-board light sensor or GPS time of day information) the receiving device could use logic to decide which data is valid.

Dual Light Sensors configured as switches. A single light sensor in a tag can have some false readings based on ambient light and user scenarios. For example, in full light situations, ambient light can reach into the bag; in this scenario the club tag would not change to dark when returned to the bag. Another example is for use at dusk: the ambient light level is low enough that the club tag does not change to light when the club is removed from the bag. Challenge:

| Light | Club out of bag |
| Light Threshold | Ambient light in bag (should be "Dark") |
| Dark | Club out of bag at dusk (should be "Light") |
| Dark | Club in bag |

A solution to this problem is to incorporate two photodetectors or light sensors in the tag at different sensitivities (one ultra-sensitive, one non-sensitive). The tag in one embodiment transmits two status bits: dark or light for each photodetector. The FOB can contain a photodetector also, to determine ambient light levels. Depending on ambient light levels, the FOB can decide which photodetector's readings are valid. The outputs from each light sensor in the club may be configured to provide such difference in sensitivity or a logic circuit in the club can process the outputs differently to achieve the same result.

For the scenario in which the ambient light reaches the club tag in the bag, the ultra-sensitive detector would have a reading of light and the non-sensitive detector would have a reading of dark. Both of these readings would be transmitted as status bits, e.g. "10" indicating that sensitive detector has a reading of light (1) and the non-sensitive detector has a reading of dark (0). This information is transmitted to the FOB or another device such as a GPS rangefinder. The light sensor in the FOB or another device such as a GPS rangefinder reads the ambient light and determines that this is a "high light" environment. Using this information the FOB determines that the valid detector reading should come from the non-sensitive detector (0=dark).

Similarly, for the scenario in which the golfer is playing at dusk, when the club is removed from the bag, the ultra-sensitive detector would have a reading of light, the non-sensitive detector would have a reading of dark. Both of these readings would be transmitted as status bits, e.g. "10" indicating that sensitive detector has a reading of light (1) and the non-sensitive detector has a reading of dark (0). This information is transmitted to the FOB or another device such as a GPS rangefinder. The light sensor in the FOB reads the ambient light and determines that this is a "low light" environment. Using this information the FOB determines that the valid detector reading should come from the sensitive detector (1=light). For systems in which the club tag communicates directly with the rangefinder (FOB-less system), the rangefinder can contain a light sensor to read the ambient light levels as described for that in the FOB or can use information about time of day to determine the normal ambient light levels.

The FOB transmits the club information to the rangefinder. This information is used for both Missing Club Reminder and Data Collection by providing the identifier(s) for the particular club(s) that is out of the bag (in those cases where a FOB is used). A particular user scenario for Data Collection is as follows: Before selecting which club to use, the golfer retrieves information from the rangefinder about his current position and distance to the hole. He then decides which club to use. He "marks the spot" by pressing a button on the rangefinder and then returns the rangefinder to his belt. When the selected club is removed from the bag, that club information is transmitted to the FOB and then to the rangefinder, and the rangefinder notes that club is the one used for the shot. This scenario eliminates the need to interact with the rangefinder more than once during a shot.

When the golf game extends into dusk, there may be a point of darkness at which the system no longer recognizes light. For this scenario, the light sensor in the FOB (or rangefinder for FOB-less system) would determine that the ambient light is too low for the club tag to recognize light. The rangefinder would then prompt the golfer to provide which club is being used. The FOB could send a message to the rangefinder alerting the golfer that it is too dark to rely on the system for club reminding and/or data collection.

Light switch and tilt switch. Combining a light sensing switch with a tilt switch in the club tag is a viable option for the "golf data collection" aspect of the product. That is, a tilt or tip-over switch can determine when the golf club is beyond a predetermined angle. This, combined with the sensing of light, is enough information to alert the golfer that the club tag is out of the bag. However, this combination will likely not solve all challenges with the "club reminding" aspect of the product. For example, translucent golf bags on a bright day will still be a problem for a combination light switch and tilt switch tag configuration. However, if an "interrogation system" is used for the club reminding function, the combination of a tilt switch and a light switch is viable for alerting the golfer as to which clubs are "out of the bag" for the data collection function. See section below on for more details on the "interrogation system" for club reminding.

Tilt switch only for data collection. If a tilt switch is configured to reliably create a closed circuit only when the golf club (with grip end up) is above a predetermined angle with respect to horizontal, a tilt switch alone could be a viable switching option to alert the golfer that a club is "out" for data collection purposes. This would not be reliable enough for "club reminding" purposes as it is possible a club could be left out of the bag while still having the grip-end up (e.g. leaning against the incline of a sand trap or a tree, etc.). There are also cases when a golfer could remove a club but never invert it so the grip end is up which could result in a lost club if relying on a tilt switch alone for the "club reminding" function.

There are several embodiments of powering the RFID tag. One embodiment is a primary battery that provides power to the RFID tag, and the tag is disposed at the end of battery life. Another embodiment includes a compartment to access the battery on the RFID tag to allow for replacing the battery when it is depleted. This battery could be a primary battery or rechargeable battery that is removed for recharging then reinstalled. Another embodiment is a rechargeable battery and a mechanism included in the tag electronics for recharging the battery in place on the tag, such as a direct connection to an AC charger, an inductive charging circuit, or a solar power charging circuit.

Figure 16A:
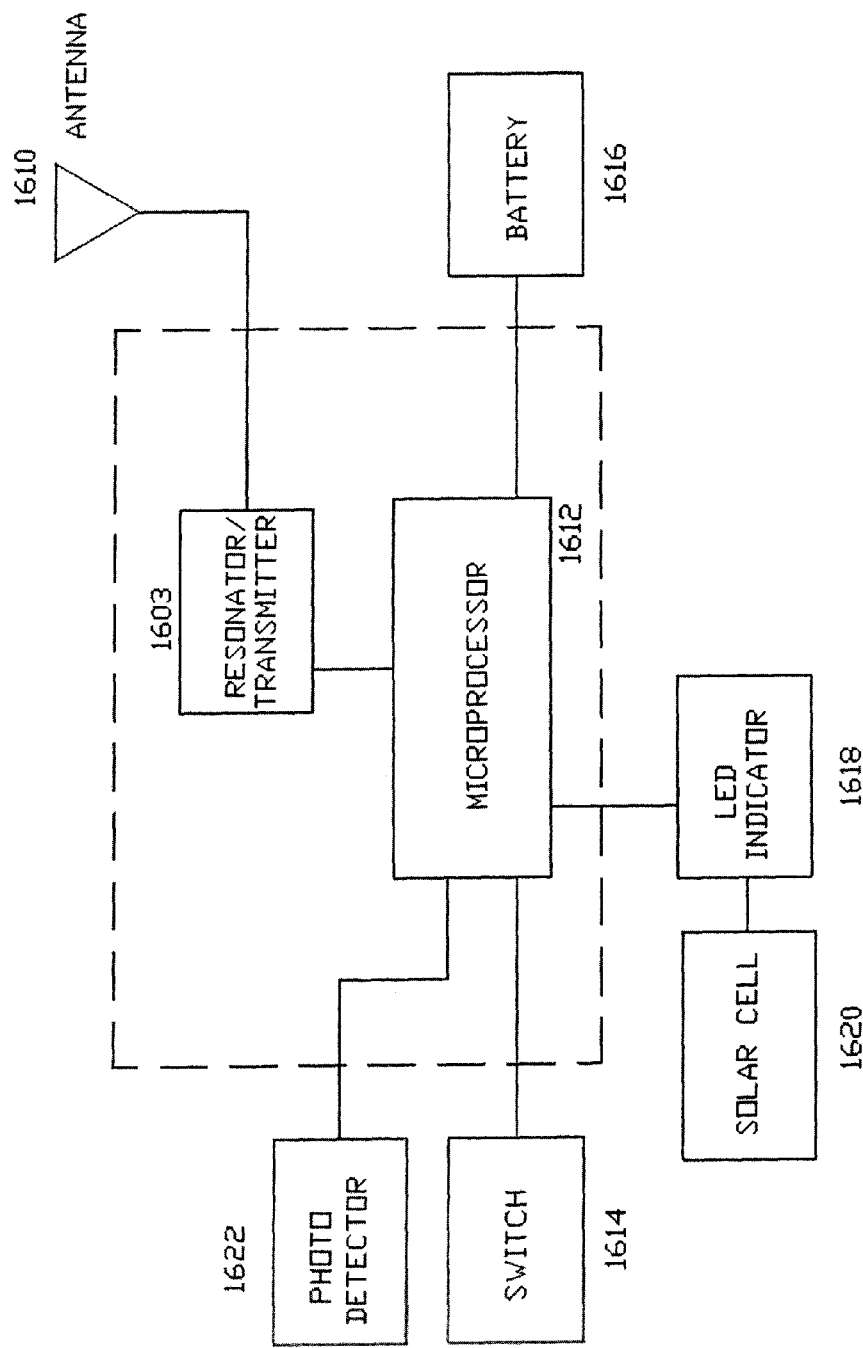
FIGS. 16A and 16B are block diagrams showing two embodiments of the circuitry included in the golf club tag.
Figure 16B:
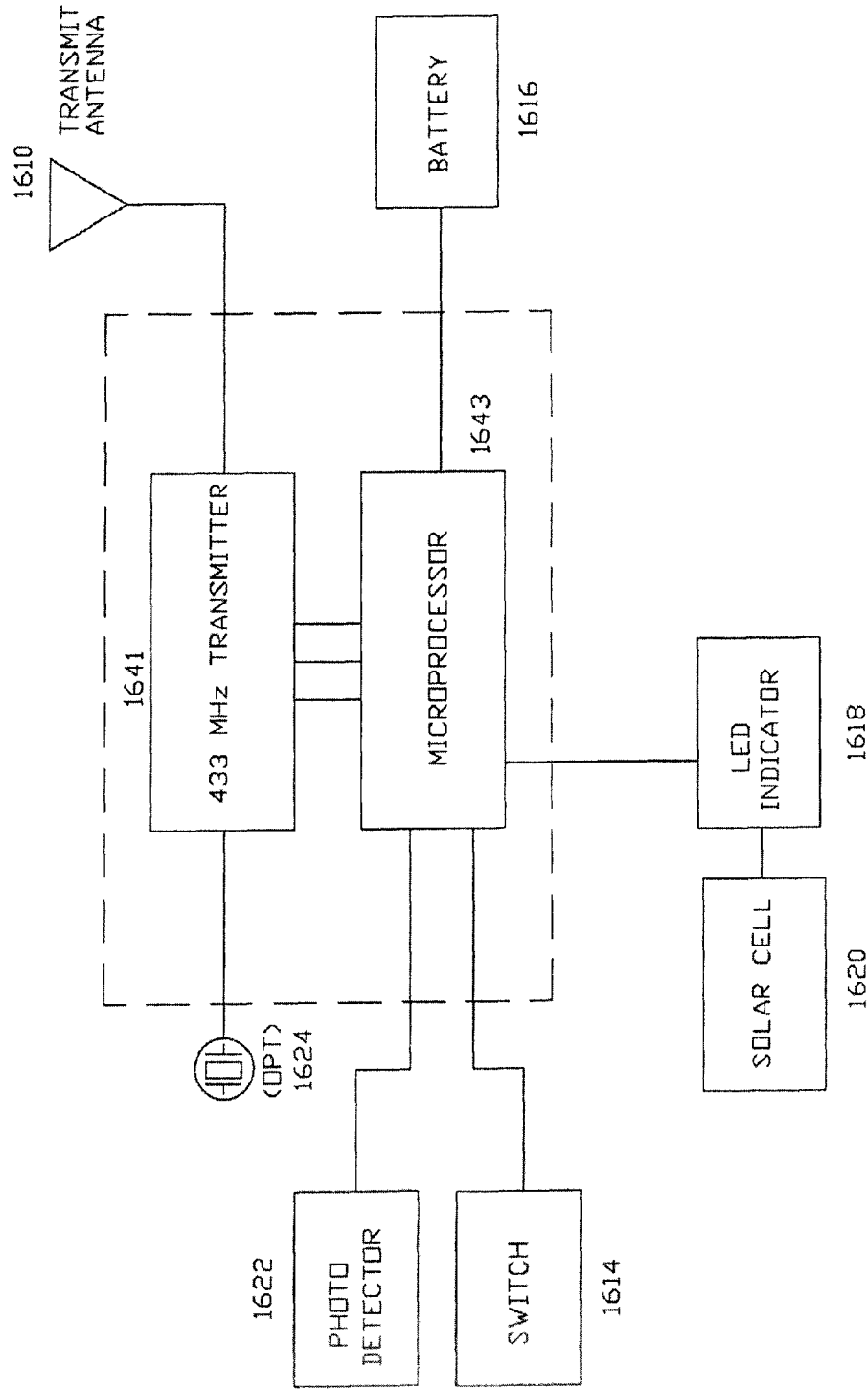

FIGS. 16A and 16B show circuitry for two embodiments of the RFID tag attached to the golf club. Items outlined in dashed lines indicate components that could be incorporated into a custom integrated circuit chip. FIG. 16A is a low-cost 433 MHz transmitter 1601 using discrete components. The signal source is a surface-acoustic wave resonator (SAW) 1603 at a frequency of 433 MHz. Using discrete transistors, such as NEC NE68019 or NE68519, the 433 MHz signal is amplified 1605, optionally filtered, and transmitted through the 433 MHz transmit antenna 1610. In a particular embodiment the final amplification stage could be an injection-locked amplifier. A particular embodiment of the transmit antenna is a 433 MHz loop antenna that is printed on the printed circuit board containing the tag electronics. FIG. 16B shows an alternate embodiment of the 433 MHz transmitter 1630, using available integrated circuit RF transceiver or transmitter 1641, such as the RF Microdevices TR3000 or TX5000, or Analog Devices ADF7011 with an optional crystal 1624.

FIG. 16C shows an embodiment of an RFID tag which can be attached to a golf club. The RFID Tag 1650 includes a logic circuit 1645, an RF Transmitter 1641, a Transmit Antenna 1610, a Battery 1616, and two Light Sensors: Light Sensor 1647 and Light Sensor 1649. In addition, the Tag 1650 can include one or more optional components such as a Switch 1614 which can be used by the golfer to indicate that a stroke should be recorded. Other optional items include the Solar Cell 1620 which powers the LED Indicator 1618 as described elsewhere in this application. Another optional component is the Optional Hard Switch 1615 which may be used to disconnect the battery from the Logic Circuit 1650 so that the Logic Circuit and the Light Sensors are not powered even in deep sleep mode. If the Optional Hard Switch 1615 is not present, then the Battery 1616 is directly connected to the Logic Circuit 1645 without interruption by a switch. The Tag 1650 also includes a timer which may implemented as a relaxation oscillator; the Timer 1652 can, at least in certain embodiments, be used to cause the microprocessor to wake up and provide power to one or both of the light sensors in order to cause the microprocessor to obtain a light measurement of the light intensity around the tag. The RF Transmitter 1641 may be similar to the RF Transmitters shown in FIG. 16A or 16B. In certain embodiments, the RF Transmitter may be coupled to a crystal, such as the Crystal 1624 which is optional, depending upon the particular implementation of the RF Transmitter. The Logic Circuit 1645 may be a microprocessor, which can take the form of a microcontroller or may be implemented as an ASIC or as a Gate Array, such as a field programmable Gate Array; the logic circuit may be programmed by software or may be hardwired to operate without software. An optional timer may be included in the Logic Circuit 1645, in which case the Timer 1652 may not be needed. The Logic Circuit 1645 also typically includes a storage unit which may be flash memory or other forms of non-volatile memory which can be used to store data, such as an RFID Identifier code for a particular club; in certain embodiments, the storage may also store the light measurement readings and state information (described below), particularly when those light measurement readings are to be transmitted to another device, such as a GPS Rangefinder Device as described herein.

The two Light Sensors 1647 and 1649 provide, in one embodiment, the ability to control power consumption and also to obtain multiple light reading measurements. One light sensor may be very sensitive to light and hence can be controlled to turn the tag on in response to a dark-to-light transition. This is described further in connection with FIGS. 27 and 28. The second light sensor can be less sensitive than the first light sensor and provide for the ability to make a light measurement, particularly after the first sensor has detected a change in light. The second light sensor may take several light measurements each of which can be prompted by the Timer 1652 as is described further below. The Timer 1652 can be used to wake up the logic circuit and the second sensor and the transmitter in order to perform a light measurement. This is also described further below in conjunction with FIGS. 27 and 28. The second light sensor which provides one or more light measurements may be implemented with a log amp which provides a logarithmic output indicating a current level which reflects a light intensity measurement.

In one embodiment, the Tag 1650 may operate in the following manner. The Light Sensor 1647 may be configured to be the high sensitivity sensor and hence it detects a change in light from dark to light when the club is removed from the golf bag. It will also detect a change from light to dark when the club is replaced into the golf bag. In response to that change, the light sensor, which had been receiving power in the deep sleep mode of the tag prior to the change, causes the Logic Circuit 1645 to exit its deep sleep mode. In turn, the Logic Circuit 1645 causes power to be supplied to the Timer Circuit 1652 and causes power to be supplied to the second Light Sensor 1649 so that one or more light intensity measurements may be obtained from the Light Sensor 1649. After a first light intensity measurement is obtained from the Light Sensor 1649, the logic circuit and the Light Sensor 1649 can be returned to a lower power state while the Timer Circuit 1652 continues to operate in order to generate a timer signal in the future to wake up the Logic Circuit 1645 and to wake up the second Light Sensor 1649. Upon being woken up again, the Logic Circuit 1645 causes the light sensor to take another light intensity measurement which can be stored with the first light intensity measurement in the storage within the Logic Circuit 1645 as shown in FIG. 16C. The timer can cause multiple light intensity measurements to be taken and stored and in each instance, the timer can cause the logic circuit and the second Light Sensor 1649 to be powered up out of a lower power state. The Logic Circuit 1645 can be programmed or implemented in such a way that after each light intensity measurement, both the Logic Circuit 1645 and the Light Sensor 1649 are both put back into deep sleep mode or a lower power consumption mode. After all of the light intensity measurements have been obtained, the logic circuit processes the set of data to determine whether or not to transmit a signal to another device, such as a GPS rangefinder with golf club reminding functionality. If the Logic Circuit 1645 decides that, based on the one or more light intensity measurements, a golf club has been removed from a golf bag, then the Logic Circuit 1645 will cause the Transmitter 1641 to transmit a signal indicating that a golf club has been removed from (or replaced into) a golf bag. In one embodiment, the signal includes an identifier, such as unique identifier relative to other clubs in the golf bag or a universally unique identifier for the golf club. In certain embodiments, in addition to the identifier, data representing the light intensity measurements can also be transmitted to the another device to allow the another device to decide for itself whether or not a golf club has been removed from (or replaced into) the golf bag. The Timer Circuit 1652 can be used, in certain embodiments, to cause this signal indicating that the golf club has been removed from (or replaced into) the golf bag multiple times. In this embodiment, the Timer Circuit 1652 can be configured such that after transmitting the first of these set of signals, the logic circuit places itself and the Transmitter 1651 in a deep sleep mode in which little power is consumed. Then in response to a timer signals from Timer Circuit 1652, the Logic Circuit 1645 wakes up again and causes the RF Transmitter to be powered up and then the signal with, for example the identifier of the golf club, is transmitted again from the Transmitter 1641 to the another device. This may be repeated multiple times, and each time after transmitting the signal, with an identifier, etc. the Logic Circuit 1645 and the Transmitter 1641 can be placed back into a low power mode.

It will be appreciated that the use of two sensors allows finer control over power management by using one sensor to turn on at least a portion of the electronics on the tag upon a transition from dark to light (or light to dark) while the other sensor can be used to obtain light intensity measurements after that process is started by the first sensor. After the first sensor initiates the process in the tag, the Logic Circuit 1645 may use its own timer or the Timer Circuit 1652 to manage the power consumption of each of the components and to also determine when the entire tag should end the one or more transmissions and return the tag to the deep sleep mode, as in operation 2815 shown in FIG. 28.

Figure 4:
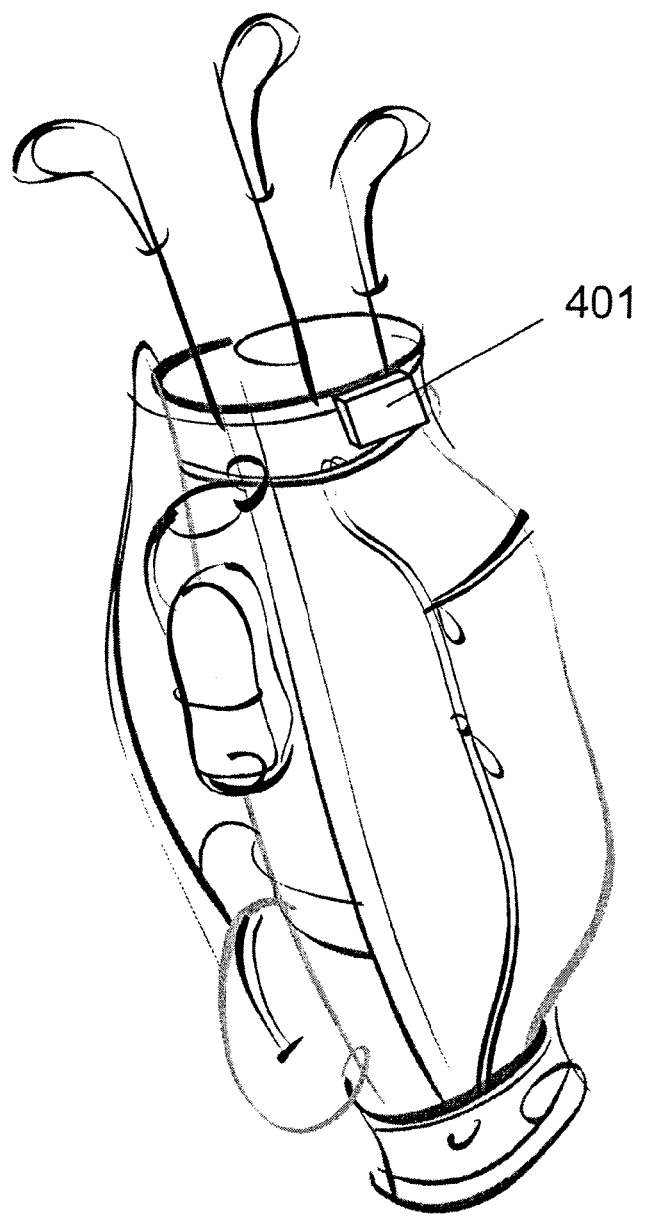
FIG. 4 shows a bag-mounted unit for receiving RFID signals from club tags for the golf club reminder function.
Figure 12:
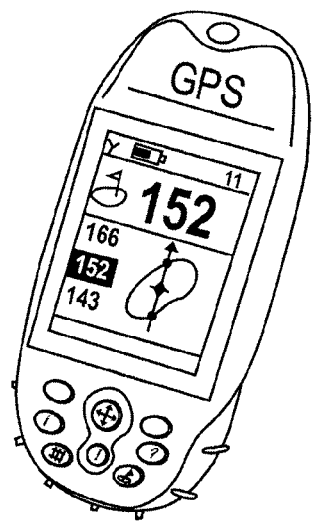
FIG. 12 shows an existing handheld GPS device used by people to map golf courses.

When the golf club is removed from or replaced into the golf bag the club tag senses the change in light and transmits a corresponding code to the receiving unit identifying the golf club and whether the club is "in" or "out" of the golf bag. The receiving unit can be built into a handheld golf GPS unit as shown in FIG. 12 or the receiving unit can be a golf bag mounted unit 401 as shown in FIG. 4.

In addition, for the club reminder function, the golf club tag can be equipped with a light sensor such as a photoconductive cell (for example a photo-transistor or photo-diode) to detect light and darkness, and to activate the transmitter circuit with this particular information. This information can be transmitted by setting information bits to a certain value, for example, the transition from dark to light can be denoted by two bits of value "01", and the transition of light to dark can be denoted by two bits of value "00". Other information bits can transmit other types of information, such as golf data collection data or the battery status of the battery (e.g. data indicating a low battery condition).

When the golf clubs are in the bag, they are in darkness. The circuit is off and the photo-detectors detect darkness. When a club is removed from the bag, the photo-detector detects light and indicates a change on a pin in the microprocessor. The microprocessor turns on and directs the transmitter to transmit a code containing the quasi-unique identifier of the golf club plus the information bits that indicate that light is being detected; therefore the golf club is out of the bag. In one embodiment the transmitter may transmit the information only once or a few times (e.g. immediately after the club is exposed to light and then at random times within the next minute) to make sure that the information is received then the circuit is returned to the off-state.

Dual Light Sensors in the Club Tags.

Some of the challenges in using golf club tags with light sensors include being able to provide accurate "in the bag" or "out of the bag" information in: 1) low light level conditions (e.g. during twilight hours) and 2) situations where the golf bag material is translucent or semi-translucent and the golf club returned to the bag is not "seated" all the way to the bottom of the bag. To address these challenges, in one preferred embodiment the golf club tags contain two light sensing devices—one configured as a "switch" and one configured as a "light meter". The light sensing may be performed in the visible portion of the electromagnetic (EM) spectrum or in other portions of the EM spectrum, including IR (infrared) and UV (ultraviolet). The switch could be configured to monitor transitions from light to dark and could have a predetermined threshold defining a transition from light to dark or from dark to light. For example, the switch could be configured to report a transition at a low light level such as 3 Lux. When the light sensor switch senses a change from darkness (i.e. less than 3 Lux) to light (3 or more Lux) it can turn on the processor which can turn on the other light sensor—the light meter. The light meter is configured to take actual light level measurements. The light meter can take a light reading and either store and/or process the data in the golf club tag or send the data to a receiving device (such as a FOB or rangefinder) to be stored and/or processed. The light meter can further be configured to convert its data into a logarithmic scale. The logarithmic scale is helpful because it can span a large range of light (e.g. 4-5 decades) without taking a lot of memory in the club tag microprocessor. It is also helpful in providing higher resolution to the lower light level scale. To resolve small variations in low illumination levels it is necessary to measure in small current steps. At high brightness levels, however, it makes little sense to collect data with such fine absolute resolution. For example, a change from 100 Lux to 200 Lux is considerable, whereas the step from 10,000 Lux to 10,200 Lux is negligible.

Continuing the example above, after the light switch turns on the processor, which turns on the light meter, the light meter might take a reading of 6 Lux. Depending on the time of day this may be a valid transition from "in" to "out" of the golf bag. During civil twilight for example this may be a valid reading. To add intelligence to the system it is contemplated to use either another light sensor or meter on the receiving device (e.g. the FOB or the rangefinder). The receiving device would compare the incoming light level data to its own measured light level data and determine whether or not the data received from the club tag is valid or not. For example, if the receiving device's light sensor is reporting a low light level when the receiving device receives the low light level data from the club tag (i.e. the reading of 6 Lux) it could interpret the data as valid. If, however, the receiving device's light sensor is reading 100 Lux and the receiving device receives an "out of the bag" reading of 6 Lux from the club tag the receiving device would determine the data was invalid and not record the "out of the bag" status. In another preferred embodiment, if the receiving device has a GPS receiver (common in golf rangefinders) the device would know the time of day for its location and would be able to use the time of day information to determine whether or not received data from the club tags was valid or not.

The light meter, combined with a light meter or GPS on the receiving device, is helpful in solving the challenges of translucent or semi-translucent golf bags. If the club tag only had one light sensor (a switch that switches at 3 Lux) a problem arises when a translucent golf bag has light levels above 3 Lux inside the bag. A club tag configured with only a light-sensing switch set at 3 Lux could be returned to the bag and not detect a transition in light; and fail to report an "in the bag" status. A light meter, however, can be configured to report significant changes in light meter readings. For example, if a light meter reads 10,000 Lux for one reading and the next reading is 10 Lux, the light meter can transmit an "in the bag" status along with the light data. The tag mircroprocessor can store in memory all recent light meter readings, for example the highest and lowest light levels read in the last half-hour. Using this information, the tag can assess the current reading and make a decision about the current state. The tag assumes that the lowest light level in recent memory is a valid "in the bag" reading, and the highest light level is a typical "out of the bag" reading. If there is a sudden change in light reading, the tag circuit takes several more light readings to confirm the change in light level. For example, if there is a sudden decrease in light, such as from sunny to shade condition, the tag would take several light level readings to confirm the new level of light. If the light level increases again, the tag would not transmit the change in light. If the light level is maintained at this lower level, the tag compares this level to the lowest level in recent memory, which is the presumed "in-the-bag" level. If the current reading is significantly higher than the previous "in-the-bag" level, the tag does not transmit the change in light. If the reading is near or below the "in-the-bag" level, the tag transmits a transition to dark status along with the new light meter reading to the golf device. Similar other scenarios would use stored recent readings to determine the in or out status of the golf club.

In another embodiment, as long as the club is in light the microprocessor stays on and directs the transmitter to continue to transmit this information on a predetermined cycle, for example every 4 minutes. This technique would overcome limitations based on detection range. The handheld GPS unit may be out of range to receive the initial signal from the club. If the club is transmitting every 4 minutes with the information that it is in light, eventually the club will be within range of the handheld GPS and this information would be received. As a specific example of one or more clubs being out of range, a golfer wearing the handheld GPS on his person asks someone to bring one or more clubs from his bag located in the golf cart a distance away. When the clubs are removed from the bag they transmit the information that they are out of the bag. Because the handheld on the golfer is beyond the range of the system, the information is not received. The clubs come into range of the handheld as they are brought to the golfer. The additional transmissions a period of time apart, for example 4 minutes, would guarantee that this information is transferred to the handheld GPS.

Relaxation Oscillator/Watch Dog Timer.

Additional challenges to implementing a system that uses active (battery-operated) light-sensing club tags include:
Providing tags with adequate battery life;
Ensuring that signals transmitted from the club tags are received by devices that may be far away from the golf bag when the club is removed or replaced;
Solving situations where a club tag may be covered (e.g. by a golfer's hand) and carried far away from the signal receiving device before being uncovered.
To address these challenges it is contemplated to add a relaxation oscillator to the club tag circuit. The relaxation oscillator operates at a very low power level and can create repetitive actions in the circuit. For example, the relaxation oscillator can be configured to "turn on" the microprocessor at a predetermined time interval (e.g. every 5 seconds). The relaxation oscillator is useful in this application for many reasons.

Relaxation Oscillator—Periodic Light Meter Readings. To continue the example above, after the light sensing switch (e.g. light sensor 1647 in FIG. 16C) senses a transition in light and turns on the light meter (e.g. light sensor 1649 in FIG. 16C), the relaxation oscillator (e.g. timer 1652 in FIG. 16C) can be used to create repetitive light meter readings by the light meter. For example, the light switch turns on the microprocessor (e.g. logic circuit 1645) and the relaxation oscillator (e.g. timer 1652). The microprocessor instructs the light meter to take a light reading and provide the measurement (reading) to the microprocessor, which stores the reading, and then turns off; then the processor turns itself off, saving battery power. The relaxation oscillator can "wake up" the processor again at a predetermined time interval (e.g. 5 seconds) which in turn instructs the light meter to take another light reading and then turn off (after the measurement from the another light reading is stored). This process can continue for a predetermined amount of time (e.g. 7 minutes) or until the light meter takes a reading that is significantly higher or lower than its previous reading, indicating a transition from light to dark or from dark to light which could be interpreted as "out" or "in" the golf bag. An example of multiple light readings is shown in operation 2807 of 6.

It is also contemplated that the golfer can enter into the receiving device (e.g. rangefinder) the type of golf bag the golfer is using (i.e. translucent or not translucent) as a configuration step. If the golfer is using a translucent golf bag the receiving unit can use this information combined with information from the light meter to determine if a golf club has been returned to the bag or not. It could even warn the golfer that a golf club might have been returned to the bag but may not be "seated" all the way to the bottom of the golf bag. See example 3 below.

Example 1

Twilight—Valid Transmission

Step 1) Light sensor switch detects a transition from dark to light (e.g. from 3 Lux to 6 Lux); [golf club has been removed from golf bag]
Step 2) Light meter takes a reading of 6 Lux and transmits "out of bag" and "6 Lux" to the receiving device;
Step 3) The receiving device's on-board light meter also reads approximately "6 Lux", or the receiving device has GPS and the time of day is during twilight hours;
Step 4) The receiving device records the data as valid and begins tracking the club as being "out of the bag".

Example 2

Daylight (Bright Day) and Translucent Golf Bag—Invalid Transmission

Step 1) Light sensor switch detects a transition from dark to light (e.g. from 3 Lux to 6 Lux); [golf club is still in golf bag]
Step 2) Light meter takes a reading of 6 Lux and transmits "out of bag" and "6 Lux" to the receiving device;
Step 3) The receiving device's on-board light meter reads approximately "70,000 Lux", or the receiving device has GPS and the time of day is during daylight hours;

Step 4) The receiving device interprets the data as invalid and does not record the "out of the bag" status.

In example 2 above it is possible that a reflection of light in the bag created the jump from 3 to 6 Lux, but the golf club never left the bag.

Example 3

Daylight (Bright Day) and Translucent Golf Bag

Step 1) Light sensor switch detects a transition from dark to light (e.g. from 3 Lux to 70,000 Lux); [golf club has been removed from golf bag]

Step 2) Light meter takes a reading of approximately 70,000 Lux and transmits "out of bag" and "70,000 Lux" to the receiving device;

Step 3) The receiving device's on-board light meter reads approximately "70,000 Lux", or the receiving device has GPS and the time of day is during daylight hours;

Step 4) The receiving device interprets the data as valid and begins tracking the club as being "out of the bag";

Step 5) The club is returned to the bag;

Step 6) The light meter reads 12 Lux (a significantly lower light level than 70,000 Lux) and the light switch does not sense a transition from light to dark (because the light level is above 3 Lux)

Step 7) Because the receiving device was configured with "translucent bag" the device could either report that the club is "in the bag" or, since the light switch is not yet reporting "in the bag" the device could warn the golfer that the club "may be returned to the bag but not seated".

In example 3 above it is important that the light switch eventually transition to dark so it can turn the tag on again. Alternatively, the light meter can be configured to continue taking periodic light measurements until it records a significantly lower light level and the switch detects a transition from light to dark at the same time. This could mean that owners of translucent bags may experience shorter battery life from their tags if they do not seat their clubs properly upon return to the golf bag.

Relaxation Oscillator—Periodic Transmissions. Another valuable feature of the relaxation oscillator is the ability to configure the tags to periodically transmit their ID code, status and/or light meter data. This is helpful when the location of the receiving device is not known. For example, if the receiving device is a FOB it can be known that the FOB is to be attached to the golf bag and will be in close proximity to the club tags when they are removed from or replaced into the golf bag. However, if the receiving device is a handheld rangefinder, the device may be: clipped to the golf bag, in the front compartment of the golf cart, clipped to the golfer's belt or in some other location. Therefore it is helpful for the club tags to be able to repeatedly transmit information for a predetermined time—enough time to reasonably ensure that the club tag will come within range of the receiving device while it is out of the golf bag. The relaxation oscillator can also be used to configure the tags to repeat the "in the bag" status for a predetermined amount of time. This can reduce potential situations where the club tag is out of the bag, then covered by a golfers hand (reporting "in the bag" incorrectly) then moved out of range of the receiving unit. If the receiving unit is configured to only record "in the bag" status after receiving 3 consecutive "in the bag" transmissions—each separated by 20 seconds for example—this would reduce the possibility a club is covered and walked far enough away from the receiving device so that the club is out of range and could be mistakenly lost without warning.

Another potential use of the relaxation oscillator is as follows: once a tag is "activated" for a round of golf (e.g. the tag detects light for the first time and turns on, or turns on by another combination of switches) the tag can repeatedly announce its presence (ID code) and a predetermined interval. For example, the tag could transmit its code every 5 minutes. If the receiving device does not hear from a particular tag for a predetermined number of transmission cycles the receiving device can warn the golfer that the club may be missing. In other words, if the receiving device does not receive a transmission from say, the putter, for 15 minutes (3 cycles) the receiving device can alert the golfer that the putter may be missing.

Alternative transmission timing methods may be employed. In an alternative embodiment, when the club is removed from the golf bag, the transmitter may transmit the code several times, then less frequently after a period of time. For example, upon removal of the club, the transmitter would transmit its code once a minute for 4 minutes, then once every 5 minutes until the club is returned to the bag.

When the golf club that has been in the light is returned to the golf bag it is in darkness. The change detected by the photo-detector is used to toggle a pin on the microprocessor. The microprocessor turns on and directs the transmitter to transmit the club code plus the information bits that indicate that darkness is being detected; therefore the golf club is in the bag. This information may be transmitted once or alternatively transmitted more than once, for example two or three times, to make sure that the information is received, then the circuit is returned to the off-state.

Alternatively, when the club is returned to the bag the transmitter transmits the information more than once that the club is in the bag. In one embodiment, the receiver must receiver more than one transmission to be valid received information. This would reduce false information is a club is not actually in the golf bag.

The RFID tag circuitry includes a microprocessor 1612 (in the embodiment shown in FIG. 16A) and 1643 (in the embodiment shown in FIG. 16B) that performs several functions. The microprocessor controls the timing of the transmit signal, creating a transmit pulse of a duty cycle. In a particular embodiment the transmit pulse is 250 milliseconds in duration. For the golf data collection function, one transmit pulse is transmitted with each button push. Alternatively, more than one transmit pulses are transmitted to ensure valid receipt of the signal by the receiver. For the missing club reminder, one or more transmit pulses are transmitted with each transition to light or darkness. The microprocessor also controls power management, providing power to the various components in the circuit only as required to save power and prolong battery life. The microprocessor also provides the pseudo-unique serial number of the RFID tag, which is associated with a particular golf club. Optionally, the tag circuitry shown in FIGS. 16A and 16B may also include an additional switch for a cancel button (e.g. to cancel the entry of a golf stroke in a golf data collection system) or the same switch may be used as described below to provide the ability to cancel the recording of the stroke (e.g. two button presses in a short period of time are decoded to indicate a cancel request rather than a "record this stroke" request).

Other elements of the RFID tag circuit as shown in FIGS. 16A and 16B include the switch 1614 that the golfer activates to turn on the RFID tag electronics, with the command to the handheld to record the location, record the club used, and record the golf stroke. The photo-detector 1622 activates the RFID tag electronics with information about if a golf club is in or out of the golf bag. A power source, such as a battery

1616, provides power to the RFID tag. Optionally, the tag circuit may include a solar cell 1620 that powers the LED indicator 1618 (or other display device such as an LCD device) when exposed to light. This LED indicator acts as a reminder to the golfer to activate the tag so that the golf data is recorded.

Figure 26:
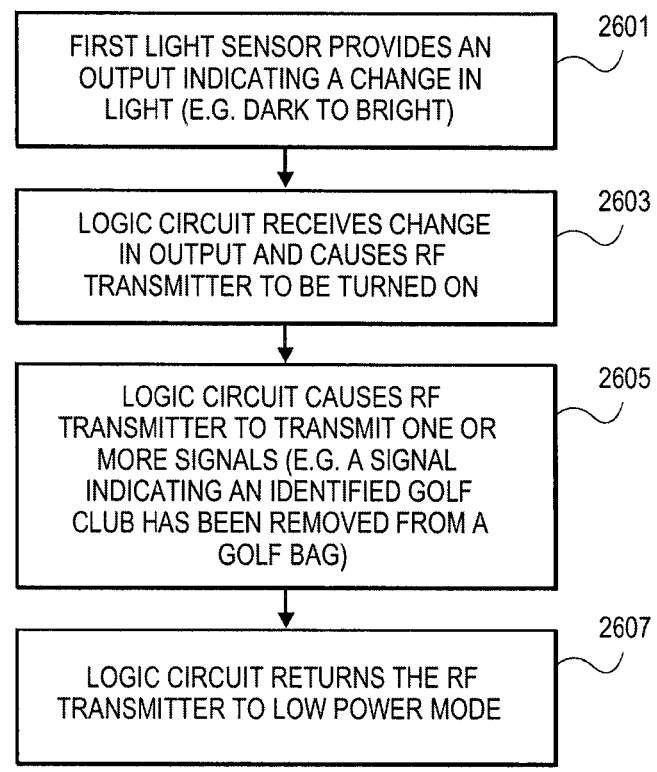
FIG. 26 is a flow chard showing a method, according to one embodiment, for monitoring the status of a golf club relative to a golf bag.

FIG. 26 shows an example of a method according to one embodiment; this embodiment may use the tag shown in FIG. 16A or the tag shown in FIG. 16B. In Operation 2601, a first light sensor provides an output indicating a change in light, such as a change from dark to light. This would suggest that the golf club has been removed from the golf bag. The tag with the first light sensor typically provides power to the first light sensor constantly so that the first light sensor can detect this change in light. The first light sensor may be configured to provide this output without drawing a significant amount of current and thereby still allowing the battery in the tag to have a respectable shelf light and operating life. While the first light sensor is in a ready mode, the logic circuit may be in a deep sleep mode which consumes very little power. In response to Operation 2601, the logic circuit receives the change in the output and exits low power mode, in one embodiment and also causes the RF Transmitter to be turned on; this is shown in Operation 2603. Then in Operation 2605, the logic circuit causes the RF Transmitter to transmit one or more signals, such as the signal indicating that an identified golf club has been removed from (or replaced into) a golf bag. Then in Operation 2607, the logic circuit returns the RF Transmitter to a low power mode and may optionally also place itself in a low power mode in such a manner that it can be woken up by the first light sensor upon the detection of another change in light.

Figure 27:
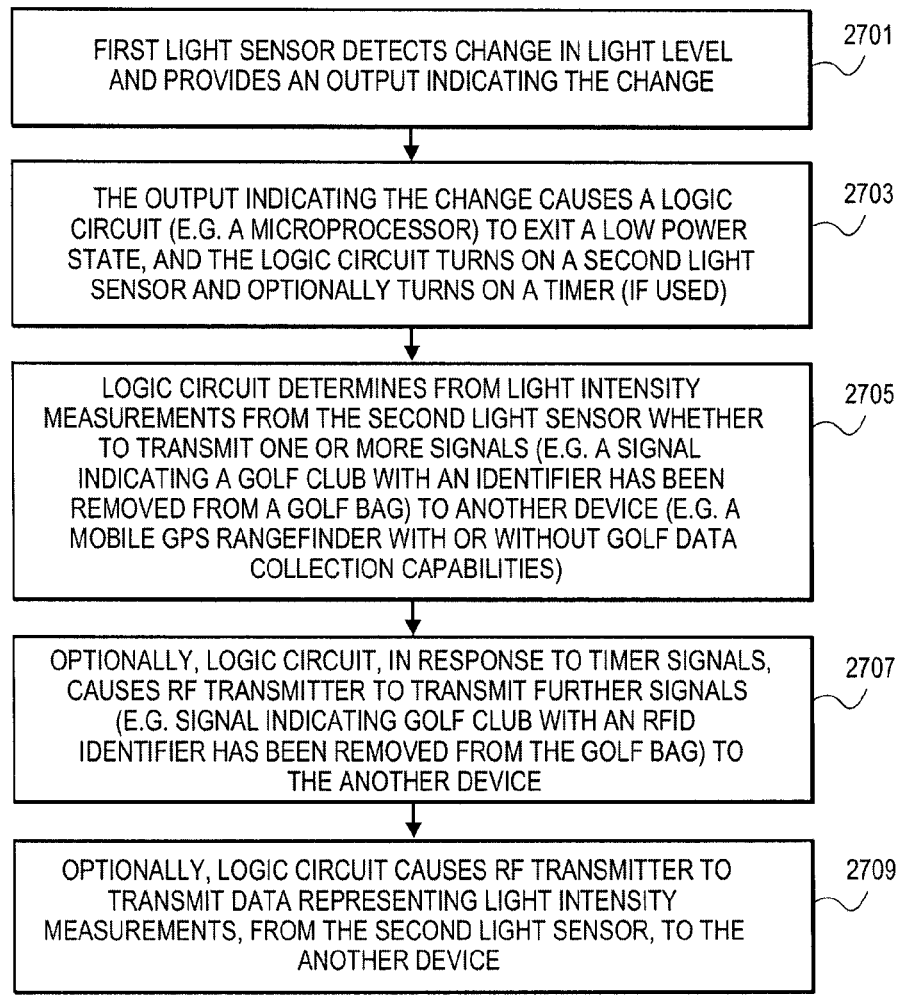
FIG. 27 is a flow chart showing a method, according to another embodiment, for monitoring the status of a golf club relative to a golf bag.

FIG. 27 shows an example of another method according to at least certain embodiments described herein. The method of FIG. 27 may be implemented with the tag shown in FIG. 16C, which includes two light sensors. In Operation 2701, a first light sensor detects a change in light level and provides an output indicating the change. The first light sensor is typically on all the time but draws very little current during that time. The first light sensor will cause other circuitry in the tag to exit a low power mode as shown in Operation 2703. In particular, the output from the first light sensor indicates the change and this causes the logic circuit, such as a microprocessor, to exit a low power mode. In turn, the logic circuit turns on a second light sensor and optionally turns on a timer, if it is used. The timer may be the Timer Circuit 1652 shown in FIG. 16C. The logic circuit in Operation 2705 then determines from a light intensity measurement from the second light sensor whether to transmit one or more signals indicating that a golf club has been removed from the golf bag. One or more light intensity measurements may be taken by the second light sensor and processed by the logic circuit to determine whether or not to transmit the one or more signals to the another device, such as a mobile GPS rangefinder with or without golf data collection capabilities. Operation 2707 is an optional operation in which a logic circuit, in response to timer signals causes the RF Transmitter to transmit further signals indicating that the golf club has been removed from (or replaced into) the golf bag. These further transmissions increase the possibility that the another device will receive the signal indicating that the golf club has been removed from (or replaced into) the golf bag. In certain embodiments, Operation 2709 may be performed; it will be understood that Operation 2709 is an optional operation. The logic circuit in Operation 2709 causes the RF Transmitter to transmit data representing the light intensity measurements to the another device so that the another device can ultimately decide whether to present a message to the golfer that the golf club is out of the bag. For example, the another device can use a time of day clock or GPS receiver which provides time or a light sensor to determine the ambient light levels at the time of the measurement in order to properly process the measurements and to decide whether to alert the golfer that the golf club has been removed from (or replaced into) the bag. After these operations shown in FIG. 27, the logic circuit after the last transmission to the another device, returns all the circuitry to a deep sleep mode except for the first light sensor which continues to monitor the light level in order to detect a change in light.

Figure 28:
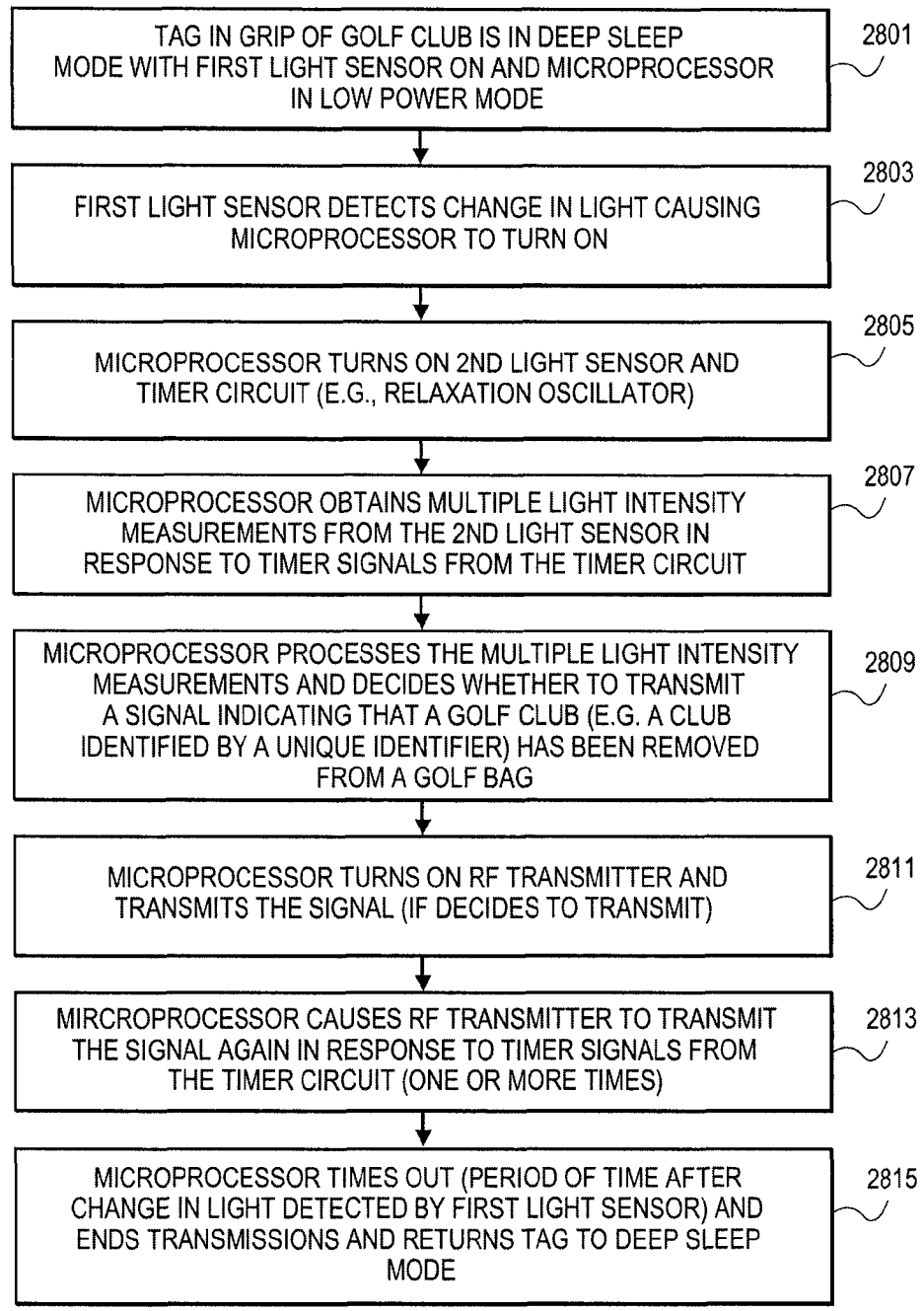
FIG. 28 is a flow chart showing a method, according to another embodiment, for monitoring the status of a golf club relative to a golf bag.

FIG. 28 shows another example of a method according to at least certain embodiments described herein. The method shown in FIG. 28 may be implemented with the Tag 1650 shown in FIG. 16C. In Operation 2801, the tag is in deep sleep mode with the first light sensor on and the microprocessor in low power mode. In Operation 2803, the first light sensor detects change in light causing the microprocessor to turn on. This change in light is typically a change from dark to light or a change from light to dark. In response, in Operation 2805 the microprocessor turns on the second light sensor and turns on the timer circuit, such as a relaxation oscillator as shown in FIG. 16C. Then in Operation 2807, the microprocessor obtains multiple light intensity measurements from the second light sensor in response to timer signals from the timer circuit. After each light intensity measurement, both the microprocessor and the second light sensor can be placed in a low power mode and they will exit that mode in response to another timer signal from the Timer 1652 in the embodiment shown in FIG. 16C. This cycle repeats until the microprocessor has taken a plurality of light intensity measurements; the number of light intensity measurements may be predetermined or may be dynamically determined depending upon the measurements. In Operation 2809, the microprocessor processes the multiple light intensity measurements and decides, based on the processing, whether to transmit a signal indicating that a golf club has been removed from (or replaced into) a golf bag. Typically, this signal would include an identifier of the club; it may also include data representing the multiple light intensity measurements so that the another device, such as a GPS rangefinder can make the decision itself whether the golf club has been removed from a golf bag based upon the ambient light level measured by the another device or based upon time of day as determined by the another device. In Operation 2811 the microprocessor turns on the RF Transmitter and transmits the signal if it decides to transmit the signal. At this point, after the transmission, the microprocessor and the RF Transmitter and the second light sensor can be placed in a deep sleep mode. Then in Operation 2813, the microprocessor responds to a timer signal from the timer circuit which causes the microprocessor to exit the deep sleep mode and causes the microprocessor to power up the RF Transmitter to transmit the signal again from the RF Transmitter. This may be repeated multiple times as determined by the number of timer signals from the timer circuit. The microprocessor can maintain its state, such as the number of times of transmissions even in deep sleep mode so that the timer is not required to count the number of timer signals in one embodiment. In other words, the microprocessor can save its state across sleep periods so it can keep track of how many transmissions have been performed, how many measurements of light intensity have been performed, etc. This will allow the microprocessor to determine when it should time out to end all transmissions and return the tag to a deep sleep mode. This is shown in Operation 2815.

Figure 29:
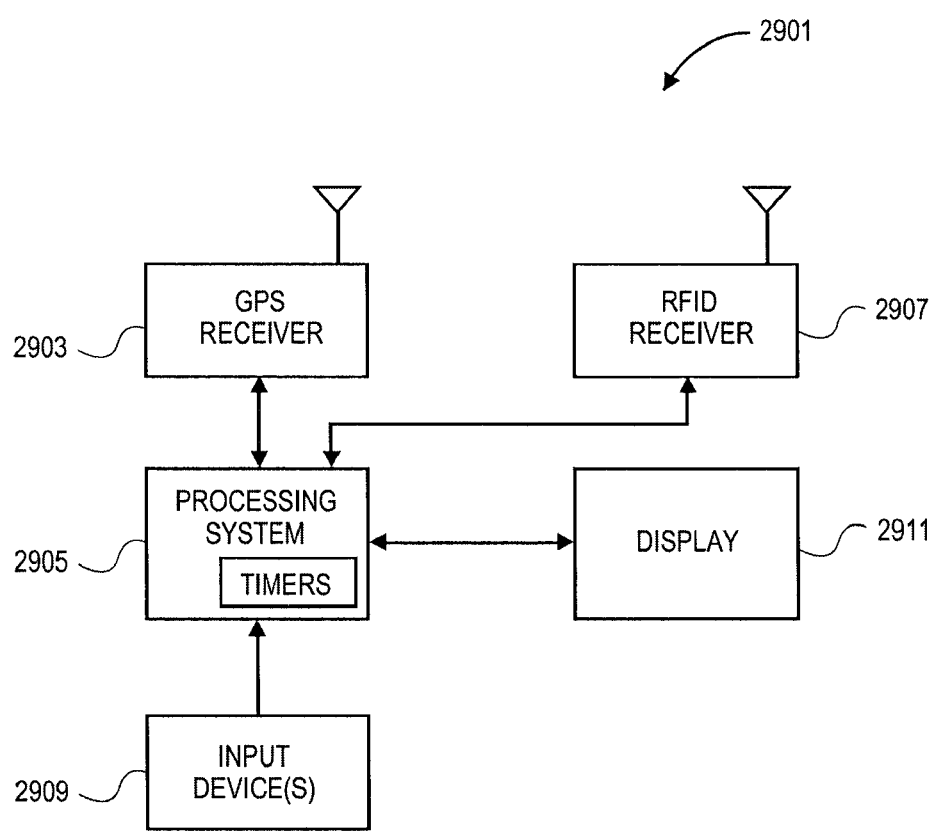
FIG. 29 is a block diagram of an embodiment of a GPS rangefinder which can also provide missing golf club reminder functionality as well as golf data collections functionality.

FIG. 29 shows an example of a GPS rangefinder device which may receive the transmissions from a tag, such as the Tag 1650 shown in FIG. 16C. The GPS rangefinder 2901 may include golf reminder capabilities as well as golf data collection capabilities in addition to the GPS rangefinding capabilities. The GPS rangefinder 2901 includes a GPS receiver 2903 which is coupled to a processing system 2905. The device also includes an RFID receiver 2907 which is configured to receive transmissions from an RFID Tag or other object in a golf club, such as the Tag 1650 shown in FIG. 16C. The device 2901 also includes a display 2911 which can provide a user interface to a golfer as described herein. The device 2901 may also include input devices such as buttons or a keyboard or a touch input panel on the display 2911. These input devices are shown as input devices 2909 which are coupled to the input processing system 2905. The processing system 2905 includes one or more timers for each of the golf clubs which have been removed from a golf bag as described above. The device 2901 also may include a real-time clock and/or a light sensor. The real-time clock may be used to determine the time of day when measurements of light intensity are received from a tag, such as the Tag 1650 as described herein. The GPS receiver, which is a form of a satellite positioning system receiver is configured to determine a position of the mobile golf rangefinder relative to a golf course as is known in the art. The timers in the processing system 2905 may be implemented in software as described above and each golf club which appears to be missing can be associated with one of the timers. When a timer times out, then a user interface is presented on the display indicating that a particular golf club appears to be missing from the golf bag. In certain embodiments, the processing system may be configured to display an identifier of the golf club to allow the golfer to record the use of the golf club to take a stroke. This may be performed automatically in certain embodiments where only one golf club has been detected as being removed from the golf bag and the system may be configured to automatically use that golf club to record the stroke being taken with that golf club at a position marked by the GPS receiver as described herein. The GPS system and the processing system can be configured to monitor the position of the device 2901 so that, when it detects that a golfer is leaving one green (at the end of a hole) and is approaching the next hole, the device 2901 can prompt the golfer to check to see if clubs, which are currently listed as being out of the golf bag, are missing and can warn the golfer to look for those clubs which are not listed as being out of the golf bag. This prompting can occur before a timer for a club "times out"; in other words, this prompting can be independent of the timer which records how long a club is reported to be out of the golf bag.

Figure 17A:
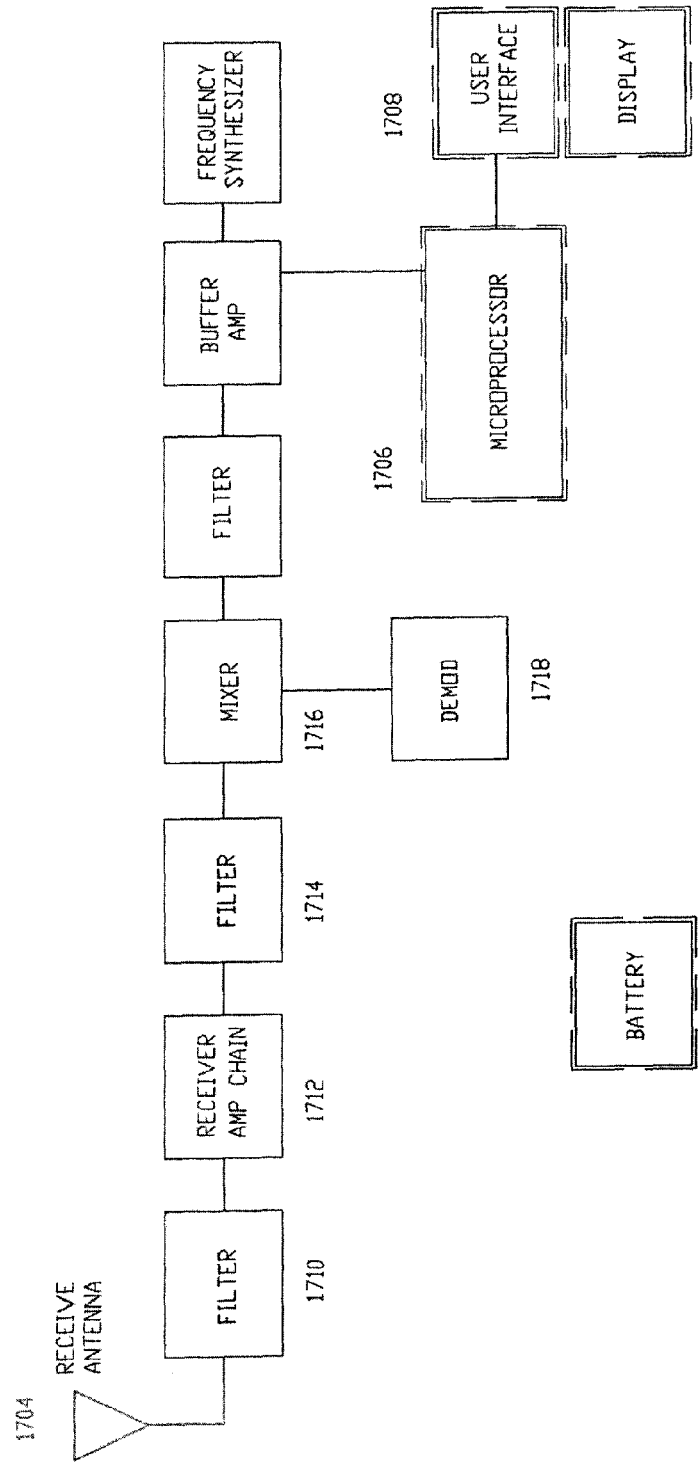
FIGS. 17A and 17B are block diagrams showing the RF receiver circuitry included in the handheld device.
Figure 17B:
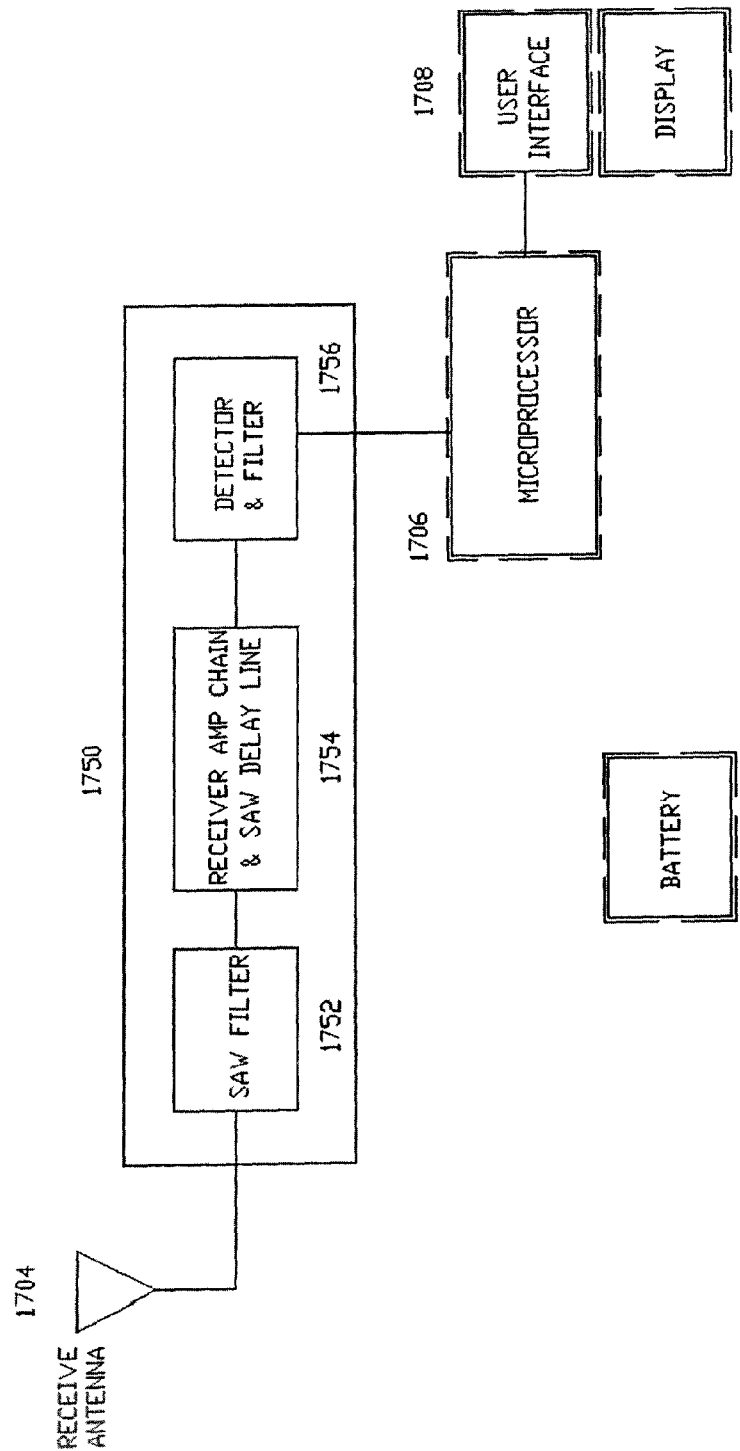

FIG. 17A shows circuitry for one embodiment of the RFID receiver or transceiver incorporated into the handheld device. The components of a separate GPS receiver are not shown in this figure but they are present in at least certain embodiments. Items outlined in dashed lines indicate components that could be shared between the RFID receiver or transceiver and GPS device; it will be appreciated that portions of the GPS receiver and the RFID receiver may be common and shared in certain embodiments. The circuit includes a 433 MHz receive antenna 1704 that receives the 433 MHz signal from the RFID tag on the golf club. This signal is filtered in filters 1710 and 1714, amplified in amplifier 1712, and demodulated in mixer 1716 and demodulator 1718 to extract the identification code from the RFID tag. FIG. 17B shows an alternate embodiment in which the receiver functions are incorporated into a single integrated circuit 1750, such as the RF Microdevices RX5000. This signal is filtered 1752, amplified 1754, and demodulated 1756 to extract the identification code from the RFID tag. In both FIGS. 17A and 17B, the microprocessor 1706 decodes the receiver signal to extract the quasi-unique identifier of the club and the status information. Optionally, the microprocessor may control other components in the receive chain, turning on devices only as required in order to conserve power and prolong battery life. The microprocessor stores information about the golf round in a storage device, such as a flash memory which is a form of non-volatile memory. When the tag transmits its information for the golf data collection function, it indicates to the microprocessor to access the GPS receiver and mark the location, register which club is used from the identification information from the RFID tag, and to register a golf stroke. When the tag transmits its information related to the missing club reminder function, it indicates to the microprocessor to track that particular club that has been removed from or returned to the golf bag. The microprocessor can then create a timer, associated with that particular club, to track how long that club remains out of the golf bag. The microprocessor also controls the user interface 1708, for example the display and buttons or switches. Optionally a speaker or vibrator may be provided as a user interface to offer feedback about information received from the RFID tag on the golf club. For example, the speaker may respond with a single beep every time the RFID tag is activated by pressing the switch on the tag; or the vibrate motor would vibrate for a period of time, for example 3 seconds. This would indicate to the golfer that the handheld received the command from the RFID tag to mark the location, register the club used, and register the golf stroke.

The RFID tag electronics, in one embodiment, are on for a defined period of time to transmit data from the club's tag to the RF receiver in the handheld. After the data transmission, an LED is illuminated on the tag to indicate to the golfer that a transmission has occurred. The LED is on continuously or optionally flashes, for a period of time, for example 2 seconds. After the data transmission and the LED indication, the circuit on the RFID tag is powered off. The microprocessor goes into an off mode and is awakened on a change to an input pin, such as would be triggered by a button push or a signal from the photo-detector.

The club tag is programmed, in one embodiment, with a quasi-unique serial number of 30 data bits. There are two additional data bits, or status bits, that indicate which function is being performed by the club tag, golf data collection or missing club reminder. The golf data collection function is performed by pressing the button on the golf club tag to indicate that a stroke is being taken. The missing club reminder is performed automatically, in one embodiment, when the golf club is transitioned from darkness to light or from light to darkness, indicating that a club has been removed from or returned to the golf bag. The two status bits may be defined as, for example: "00" indicates transition to darkness, or the club is returned to the golf bag; "01" indicates transition to light, or the club is removed from the golf bag; "10" indicates that the golfer has pushed the button on the club tag, indicating that a golf stroke is being taken; "11" can be used for other functions, for example a low battery indicator.

Figure 21:
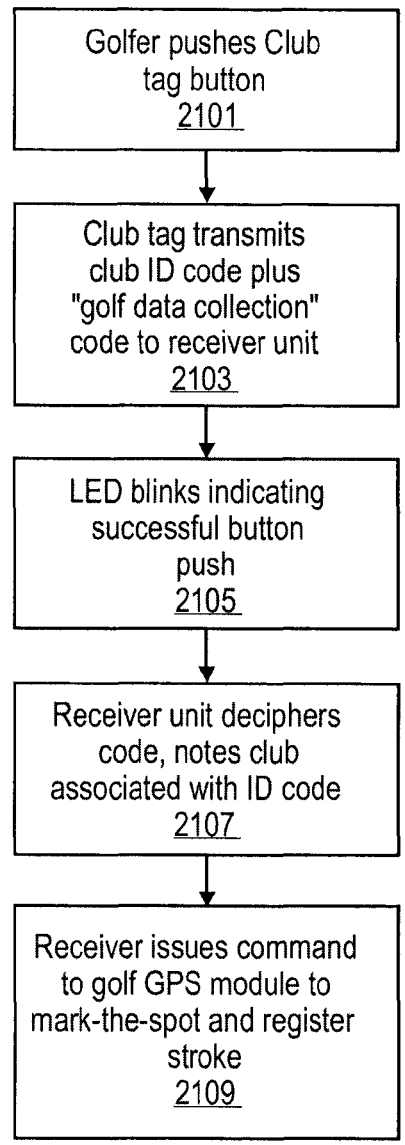
FIG. 21 is a flow chart showing operations in the golf data collection system. Pushing the button on the club tag indicates that a stroke is occurring. This information is transmitted to the receive unit, which deciphers the code indicating the golf club used and registers the current location and register the stroke.

The microprocessor in the golf club tag is normally in sleep mode to minimize current consumption and to extend the life of the battery. When the push button is depressed, the microprocessor immediately wakes up and transmits the semi-unique 30-bit serial number ID followed by the 2 bits of status. The status bits could be "10" to indicate that the button has been pushed and the golfer is recording a stroke. After the transmission, the microprocessor returns to sleep mode. FIG. 21 is a flow chart that illustrates operations in the golf data collection function in one embodiment. Pushing the button (operation 2101) on the club tag indicates that the golfer is taking a stroke. The club tag transmits, in operation 2103, the identification code associated with that particular golf club, plus the status bits to indicate that this is a golf data collection function. The LED on the club tag blinks in operation 2105, indicating to the golfer that the button has been pushed. When the receiver unit receives the code and status indicating the golf data collection function, the receiver unit registers which club is being used (operation 2107), and registers the location of the stroke using GPS data from a GPS receiver and registers the count of the stroke (operation 2109). In one embodiment, the receiver may indicate to the golfer that this information was received, for example with a message on the visual display, an audio signal or a vibration.

Figure 20:
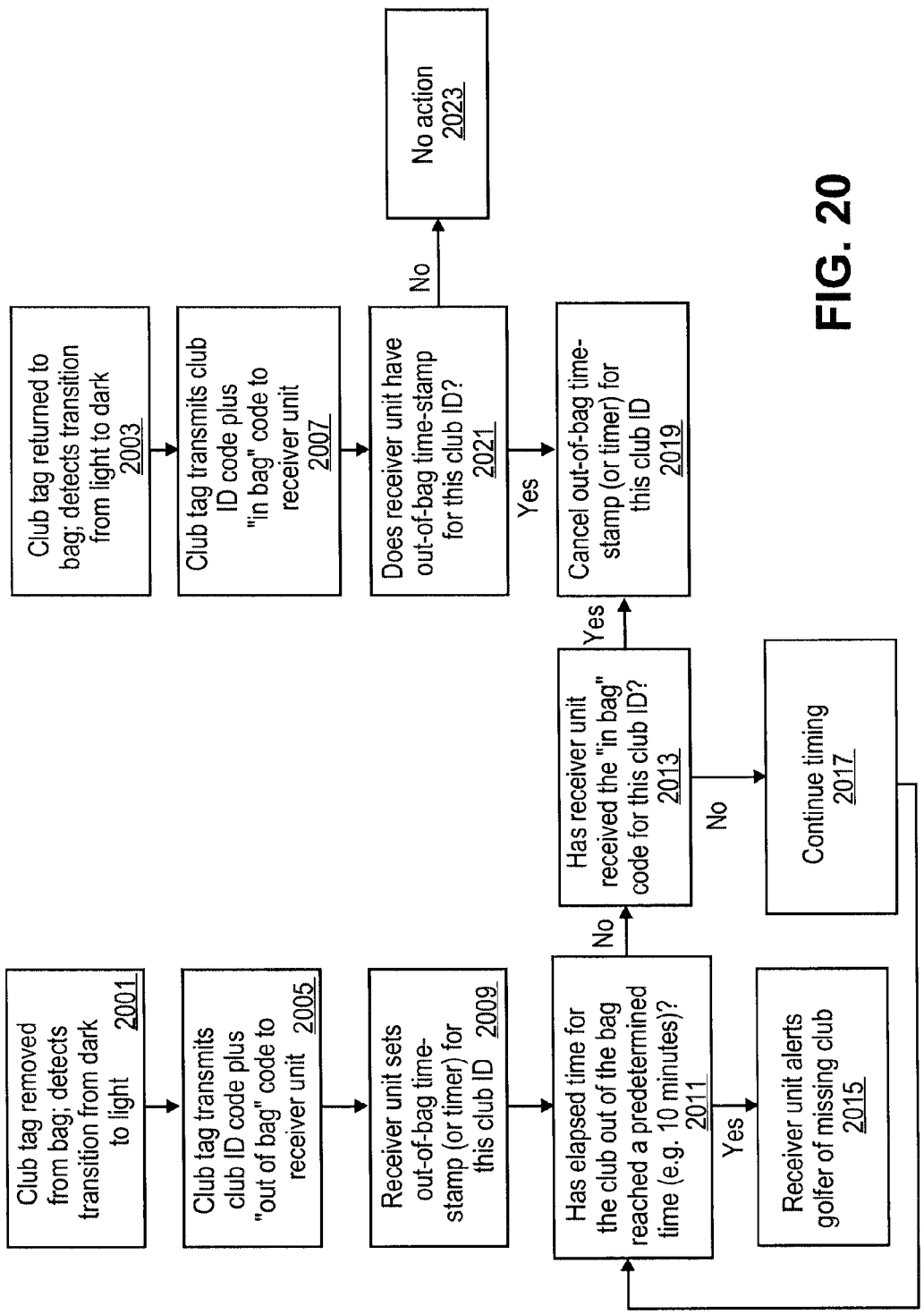
FIG. 20 is a flow chart showing operations in the club reminder function. This function uses a significant change in ambient light to track if a club is in light or darkness, that is out of the golf bag or in the golf bag.

The microprocessor is also awakened by a significant change in ambient light, indicated by a change in output of the photo detector. The microprocessor is programmed to wake up whenever there is a transition on the input pin from the photo detector. The microprocessor wakes up, recognizes that there has been a light change, or transition, and transmits the 30-bit golf club ID followed by the 2 bits of status. The status bits could be either "00" or "01" to indicate a transition between light and darkness. FIG. 20 is a flow chart that illustrates the club reminder function in one embodiment. When a club tag encounters a significant change in ambient light (in either operation 2001 or 2003), it transmits that state (light or darkness) to the receiver unit (operations 2005 or 2007). The receiver unit receives the club code to indicate which club it is and whether it is in light or darkness, therefore out of the bag or in the bag. When the club is removed from the bag, the receiver unit receives information that the club is in light and therefore out of the bag. The receiver unit starts a timer, notes a time, or sets a time stamp, associated with that club being out of the bag (operation 2009). After a predetermined amount of time, for example 10 minutes, if the club has not been returned to the bag, the receiver unit issues an alert to the golfer (see operations 2011, 2013, 2017 and 2015 in FIG. 20). A timer may be implemented in software or hardware or a combination of hardware and software. A timer may be implemented by recording a time (e.g. GPS real-time obtained from a GPS receiver which is coupled to the microprocessor) when an out-of-bag code for a particular club was received by the receiver unit. The microprocessor can then periodically compare current GPS time (or other source of current time) to the recorded time for that club to determine how long that particular club has been out of the golf bag. In this implementation, the microprocessor can maintain multiple timers, one for each club identified with a club identifier and an out-of-bag time stamp, by comparing GPS time (or another source of time such as a battery powered real-time clock) to each out-of-bag time stamp.

An alternate embodiment of the current invention is the RF receiver in a stand-alone bag-mounted device that performs the missing club reminder only.

Optionally, in addition to the time stamp upon club removal, the receiver unit notes a GPS location associated with the removal of the club. In one embodiment, the club tag continues to burst its transmission code for a period of time, for example 4 minutes. The GPS location is modified with each transmission burst. After the last GPS location is noted in the receiver, the receiver unit tracks its location by GPS. If the GPS location is a predetermined distance away from the GPS location noted when the club was removed, for example 300 feet, the receiver unit issues an alert to the golfer that a club is missing. Repeatedly transmitting the code over a period of time allows for the golfer to remove a club, travel a distance with the club by golf cart or walking, and reaching the destination.

When the golf club is returned to the bag, the club tag goes into darkness and transmits the club ID code plus the status that the club is in darkness (operation 2007). This information may be transmitted once or more than once. The receiver unit receives this information and determines, in operation 2021, whether the receiver unit has an out-of-bag time stamp for this club and notes that the club is back in the golf bag. This action cancels the "out of the bag" status (operation 2019) and time monitoring of the initial removal of the club from the bag. This action also cancels the optional GPS tracking of location of the club when it was removed from the bag. If operation 2021 determines there is no out-of-bag time stamp for this club, then no action is taken (operation 2023).

The additional status bit could be used to indicate a low battery in the golf club tag. In this case, the golf club tag monitors its battery life and could set these status bits to "11" if the battery is nearing the end of its life and transmits the data.

This invention uses, in at least certain embodiments, common electronics for several functions. The basic circuit can be a RF transmitter, consisting of an oscillator, amplifier, and a microprocessor. The microprocessor provides the quasi-unique identification code associated with that particular golf club tag. The golf data collector function utilizes the transmitter with the transmitted quasi-unique identification code, initiated by depressing a push-button switch. The missing club reminder uses the same transmitter and microprocessor, including the same quasi-unique identification code associated with the club tag, plus a photo detector. The missing club function is initiated by the transition of light to dark or dark to light. A low battery function uses the same transmitter and identification code, and is transmitted as a result of monitoring battery voltage. The information transmitted for all functions is the same quasi-unique identification code associated with the tag plus two status bits indicating which function is being performed.

The modulation technique used may be On-Off-Keying or OOK. The communication protocol used can be a form of narrow-band spread spectrum. In this particular embodiment, the data string transmitted by the club tag is 32 bits long (30 data bits plus 2 status bits). Each bit is represented by 15 bits or chips of a particular PN code. An ID bit of value "1" is represented by a string of 15 chips in which the PN code is transmitted erect; similarly an ID bit of value "0" is represented by a string of 15 chips of PN code transmitted inverted. This technique is used to filter out random noise and to facilitate reliable ID bit synchronization.

The RF Receiver in the golf GPS system receives the transmission from the golf club tag and determines from the status bits what type of data has been transmitted. The receiver microprocessor performs a cross-correlation of the received PN code against the known transmitted PN code. In this particular embodiment, a correlation match of at least 14 of the 15 chips indicates that a correct ID bit has been received.

For the missing club function, the receiver keeps track of all of the golf club IDs that are out of the golf bag. The receiver sends an alarm to the golfer if the club has not been returned to the bag within a predetermined time interval, for example 10 or 15 minutes. In some embodiments, the time interval may be adjustable by the golfer through a user interface on the receiver unit. The alarm could be in the form of visual information on the display, an illuminated or blinking LED, a vibration, or an audio buzzer, or any combination of these.

Alternatively, the receiver would track the GPS location when the club is removed and monitor each new location as the GPS unit is moved. If a new location is a predetermined distance away, for example 300 feet, from the original spot in which the club was removed, an alarm is sent to the golfer. See FIG. 23, discussed further below, which shows methods according to this embodiment of a golf club reminder system which uses GPS locations to determine whether to alert a golfer about a missing club.

For the data collection function, the receiver uses the club tag data to indicate to the GPS golf system which club is being used, along with a command to mark the spot using GPS information and register the golf shot.

For the low battery function, the receiver issues an alarm to the golfer indicating which club has a tag with a low battery. The alarm could be in the form of visual information on the display, an illuminated or blinking LED, a vibration, or an audio buzzer, or any combination of these. Alternatively, the golf club tag could issue the low battery alarm, in the form of an illuminated or blinking LED on the club tag itself.

In some instances the golfer will remove or replace more than one club at a time from or into the golf bag. To prevent collisions in data transmissions from multiple clubs that might be removed from the golf bag simultaneously, different golf club tags will employ different time delays, or staggering, between the detection of light and the start of a burst transmission. The Least Significant Bits, or LSBs, of the semi-unique serial number will be used, in certain embodiments, as a fairly unique numerical delay used by that golf club tag. These LSBs will indicate the number of unit delays between the detection of light and the beginning of the burst transmission. A unit delay will be greater than the burst transmission length so that multiple transmissions have a small probability of overlapping each other. A pulse may be transmitted once or more than once, and this semi-unique time delay would be incorporated in between multiple transmitted bursts.

Figure 19:
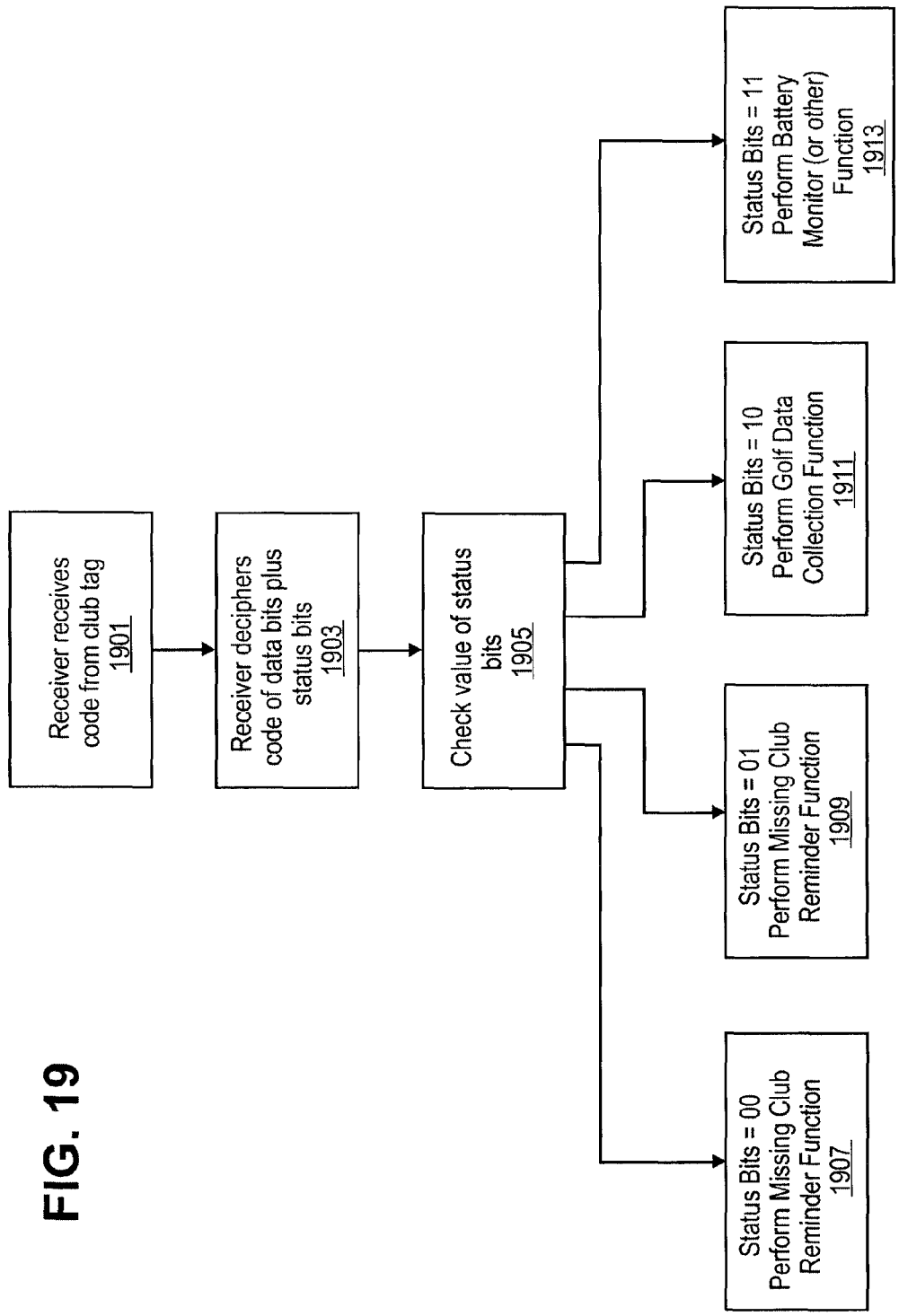
FIG. 19 is a flow chart showing the function of the receive unit that receives the identification code plus status bits to indicate which function to perform. The value of the status bits determine which function is being performed.

FIG. 19 is a flow chart that shows operations of a receiver that performs several functions. The transmitted identification code includes status bits that are set by the transmitter depending on which function is being performed. The receiver receives and deciphers the code and checks the status bits to determine which function is being performed (operations 1901, 1903 and 1905). In this particular embodiment, the status bits have, in one embodiment, four different values: one each for transition to light and transition to dark used for the club reminder system (see blocks 1907 and 1909); one value for the golf data collection function (see block 1911); and one value for low battery or monitor (block 1913). It can be appreciated that other functions may be used in place of the low battery monitor. Alternatively additional status bits may be incorporated to identify other functions.

In one embodiment of this invention the RFID receiver or transceiver is in the handheld GPS unit. The handheld GPS unit receives the club code and the information that the club is in the light or the dark. The microprocessor in the receiver tracks which club is out (light) and when it is returned to the bag (dark). If a club is out for a predetermined amount of time, for example, 10 or 15 minutes, the handheld GPS unit gives an indication to the golfer that a club is still out of the bag (e.g. a flashing light, an audio signal, a buzzer, etc.).

In another exemplary embodiment of an aspect of the invention, a separate device is mounted on the golf bag. This bag-mounted device performs the club reminder function and communicates with the handheld GPS unit. The device contains a RF transceiver. The receiver in the transceiver receives the information transmitted by the club tag that the club has been removed from or returned to the golf bag using the photo detection technique previously described. The bag-mounted device tracks if is club is out of the bag and if it has been returned to the bag. If a club is out of the bag for a predetermined amount of time, for example, 10 or 15 minutes, the bag-mounted device gives an indication to the golfer that a club is still out of the bag (e.g. a flashing light, an audio signal, a buzzer, etc.) Alternatively, the bag-mounted device may transmit the club tracking information to the handheld GPS unit using the transmitter function of the transceiver and the handheld unit can present an alert to the golfer of the missing club.

There are various scenarios in which false information may be communicated. For example, if the golf club is out of the bag, in the light, and the golfer wraps his hand around the tag putting it in darkness. The tag would transmit information that it is in the dark. When the golfer removes his hand from the tag, the tag would transmit information that it is in the light. In this scenario the golf club tag would indicate that the club came out of the bag, went in then came out again, with the end result being that the club is still out of the bag. It is likely the signal sent from the club tag in the above scenario may be out of detection range of the bag-mounted receiver unit. If in detection range, the incorrect information would be insignificant because the information that the club is out of the bag is the critical information. The end result would likely be proper alerting to the golfer, as the amount of time a club has to be out of the bag before triggering an alarm will likely be set to a longer period of time than a golfer might cover up the tag with his hand (for example, 10 or 15 minutes).

An alternate embodiment of the current invention is the RF receiver in a stand-alone bag-mounted device that performs the missing club reminder only. There are several techniques for powering this device that conserve battery life and eliminate the need for the golfer to remember to turn the device on. A motion sensor could be included in this device. The microprocessor wakes on a change of motion or significant change in ambient light. If the device is in light and there is movement, the device is powered on and stays on for a predetermined amount of time, for example 40 minutes. If the device is in light and there is no movement, the device powers off. If the device is on and it is in the dark for a predetermined amount of time, for example 40 minutes, the device is powered off. If there has been communication that a golf club is in or out of the golf bag, the device would not power off until after a predetermined amount of time, for example 40 minutes.

In one embodiment of this invention, the transmitter electronics in the golf club tag can transmit at different power levels depending on which function is being performed. The transmitter operates at full power for the golf club data collection system to maximize the range between golf club tag and the GPS golf system, which may be located on a golf bag or in a golf cart (rather than on the golfer as shown in FIG. 1A). This range is not necessary for communication between the golf club tag and the bag-mounted device in one embodiment of the missing club reminder system. The required range is the distance between the club and the bag-mounted device as the club is being removed from or returned to the golf bag. Reducing the transmit power to perform over this reduced distance uses less battery power and extends the life of the electronics. This technique would reduce the possibility of incorrect missing club data being received by the bag-mounted device. For example, if the golfer places the golf club against the ground in high grass, the club tag may indicate that it is in darkness, and therefore is in the golf bag. In reality the club is still out of the bag and might be missing.

The reduced range would be advantageous because the device would only receive data from clubs that are close to the bag, such as those clubs being removed from or returned to the golf bag. Another advantage of the reduced transmit power is the reduced possibility of a missing club reminder system transmitting a signal at the same time and colliding with another system. If each device can only communicate in the near proximity with the golf bag to which it is attached, there is less chance of interfering with other devices on other golf bags.

Figure 23:
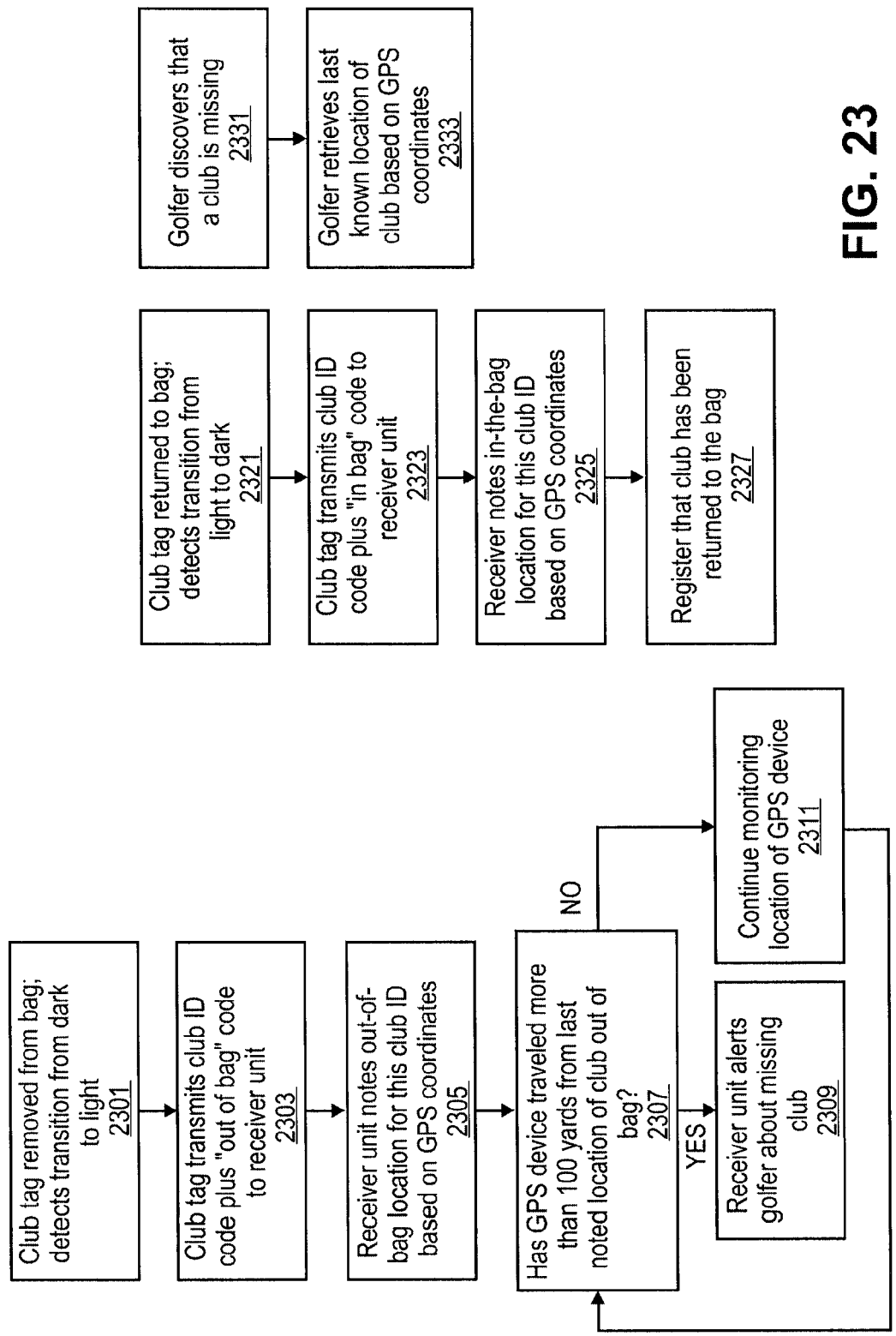
FIG. 23 illustrates a golf club reminder system in an alternative embodiment.

Optionally, this bag-mounted device could also contain a GPS receiver. The device in this case may track the GPS location when the club is removed and monitor each new location as the device is moved. If a new location is a predetermined distance away, for example 100 feet, from the original spot in which the club was removed, an alarm is sent to the golfer. The alarm could be in the form of visual information on the display, an illuminated or blinking LED, a vibration, or an audio buzzer, or any combination of these. FIG. 23 shows three flow charts which depict examples of how such a device can operate. In operation 2301, a club tag detects a transition from dark to light and this causes the club tag to transmit, in operation 2303, the club ID (identifier) and an "out-of-bag" code to the receiver unit which includes a GPS receiver (or is in communication with a GPS receiver). The receiver unit stores the out-of-bag location using coordinates from the GPS receiver (or other positioning system) in operation 2305. In other words, the receiver unit stores an indication that an out-of-bag code for a particular club (identified by a club's transmitted code) was received at a location specified by the coordinates from the GPS receiver. Then in operation 2307, the receiver unit determines whether the GPS device (in the receiver unit) has traveled more than a certain distance (e.g. more than 100 yards) from the stored location associated with the out-of-bag code for the particular club. If the GPS device has not so traveled, then (through operation 2311), the location of the GPS device is continued to be monitored, returning periodically to operation 2307 to determine whether or not to issue the alert in operation 2309. The alert is issued if it is determined that the distance between (a) the current position (as determined by, for example, GPS coordinates for the current position of the GPS receiver) of the receiver unit and (b) the position when the out-of-bag code was received by the receiver unit exceeds a certain amount (e.g. more than 100 yards). When the club is returned to the bag (operation 2321), the club tag detects the transition from light to dark and transmits, in operation 2323, the club ID and an "in-bag" code to the receiver unit which, in operations 2325 and 2327, notes the in-bag location for this club and registers that the club has been returned to the bag. The storing of the out-of-bag location allows a golfer, once alerted to a missing club (operation 2331), to go directly to the stored location (operation 2333) without having to retrace a path through a golf course.

Figure 22:
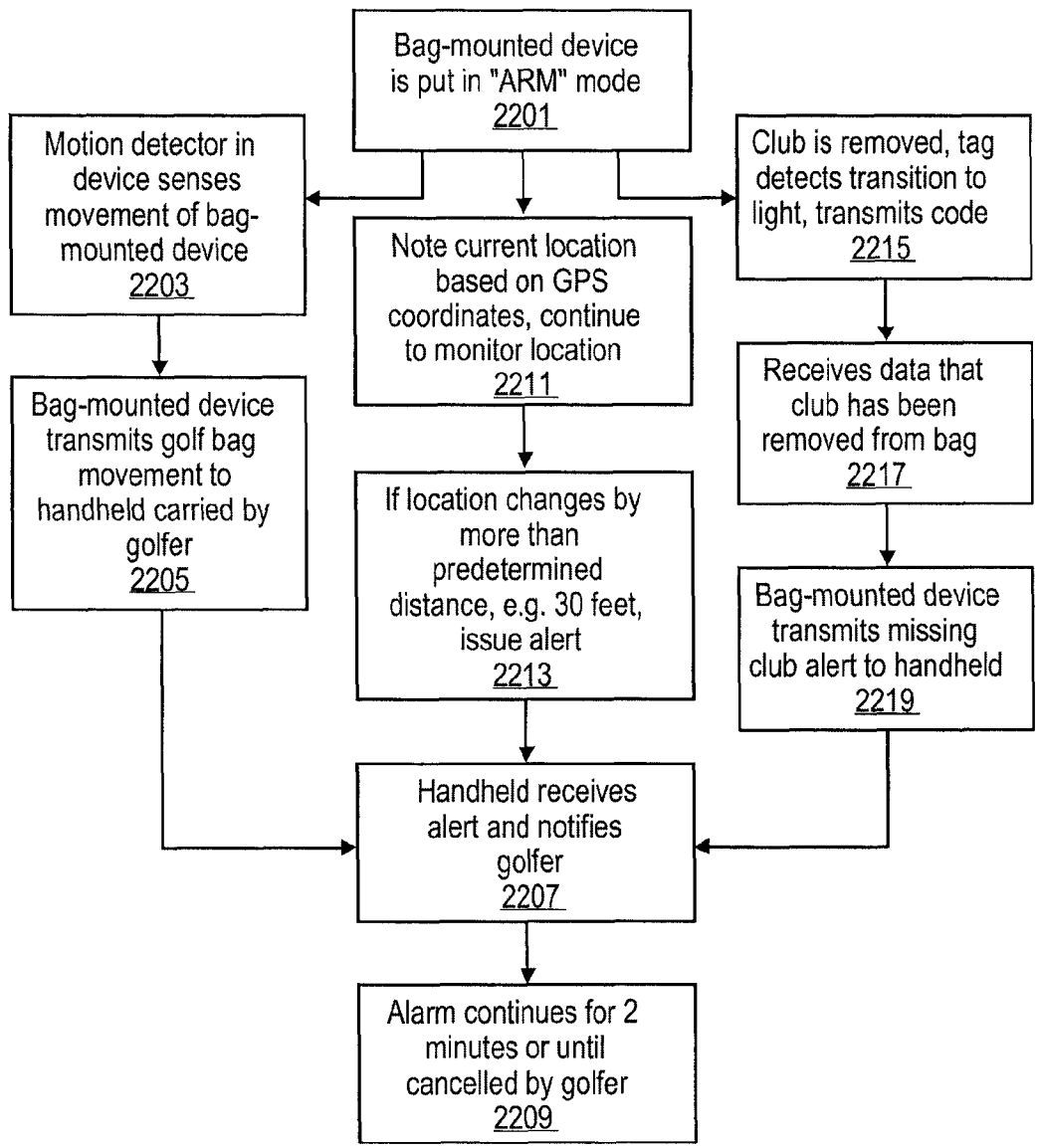
FIG. 22 is a flow chart showing the various methods of preventing the theft of a golf bag or golf clubs. The flow chart shows 3 paths beginning from the operation at the top of the flow chart, and each of these paths may be independent and occur concurrently.

FIG. 22 is a flow chart showing another embodiment of this invention which includes a theft deterrent system. One embodiment is a bag-mounted device containing the RF receiver as described for the golf data collection, missing club reminder, and low battery functions. Additionally this device is equipped with a motion sensor and optionally a GPS receiver. In another embodiment, this device is equipped with a transceiver capable of transmitting and receiving information about GPS coordinates of its current location, including communication on a GSM network or other wireless network.

The bag-mounted device can be configured to send an alarm to a golf GPS device or receiver if a club is removed from the golf bag or the entire golf bag is moved. The bag-mounted device can be put in an "ARM" mode (operation 2201). In this mode, any movement of the bag can be detected by the motion sensor in the bag-mounted device (operation 2203). If motion is sensed, the bag-mounted device transmits an alert to the GPS golf system or handheld receiver or transceiver carried by the golfer (operation 2205). The alarm would continue for a predetermined period of time, for example, 2 minutes, or until cancelled by the golfer (operation 2209). Alternatively, this alarm could be issued by the bag-mounted device in the form of an audible alarm, which would deter the theft.

If a club is removed from the golf bag the club transmits its code indicating that there has been a transition to light, that is, that the club has been removed from the golf bag (operations 2215 and 2217). If the bag-mounted device is in ARM mode, it sends an alert (operation 2219) to the GPS golf system or handheld receiver or transceiver carried by the golfer. The alarm would continue for a predetermined period of time, for example, 2 minutes, or until cancelled by the golfer.

Alternatively, this bag mounted device also contains a GPS receiver that tracks the location of the device on the golf bag or hidden inside the golf bag (operation 2211). When in the "arm" mode, the device would issue an alert (operations 2213 and 2207) if the golf bag is moved a predetermined distance away from the point at which it was armed using GPS coordinates and distance calculations. The alert would transmit by wireless communication to the receiver unit carried by the golfer. This alert could be communicated by RF communication such as a GSM network or other wireless network. Alternatively there may be a central receiver, for example inside a pro shop, which tracks several golf bags at the same time. These bags might be for example outside a restaurant at the golf course. If a bag is removed, the central receiver is alerted to the removal of the bag and can alert the golfer who owns the bag. The alert can be by wireless communication to the receive device on the golfer or by an announcement on a speaker. The movement of the missing golf bag can be tracked by GPS coordinates and tracking. This information is provided to the golfer so that the missing bag can be recovered. The bag mounted device may also be placed in a disarmed mode to allow it to be used by its owner.

In one embodiment, the bag-mounted device used to track movement of the golf bag uses a transmitter with antenna that transmits at the maximum allowed power. This transmission is broadcast to the receiver or golf GPS device carried by the golfer. In certain embodiments, the transmission may include GPS coordinates so that the user could track the location of the missing golf bag. In another embodiment, the bag-mounted device contains GPS tracking circuitry that notes its location and transmits its location to a system that monitors movement within the GPS network. This would allow for user tracking of the stolen bag using a web site that monitors movement in a GPS network.

Figure 24:
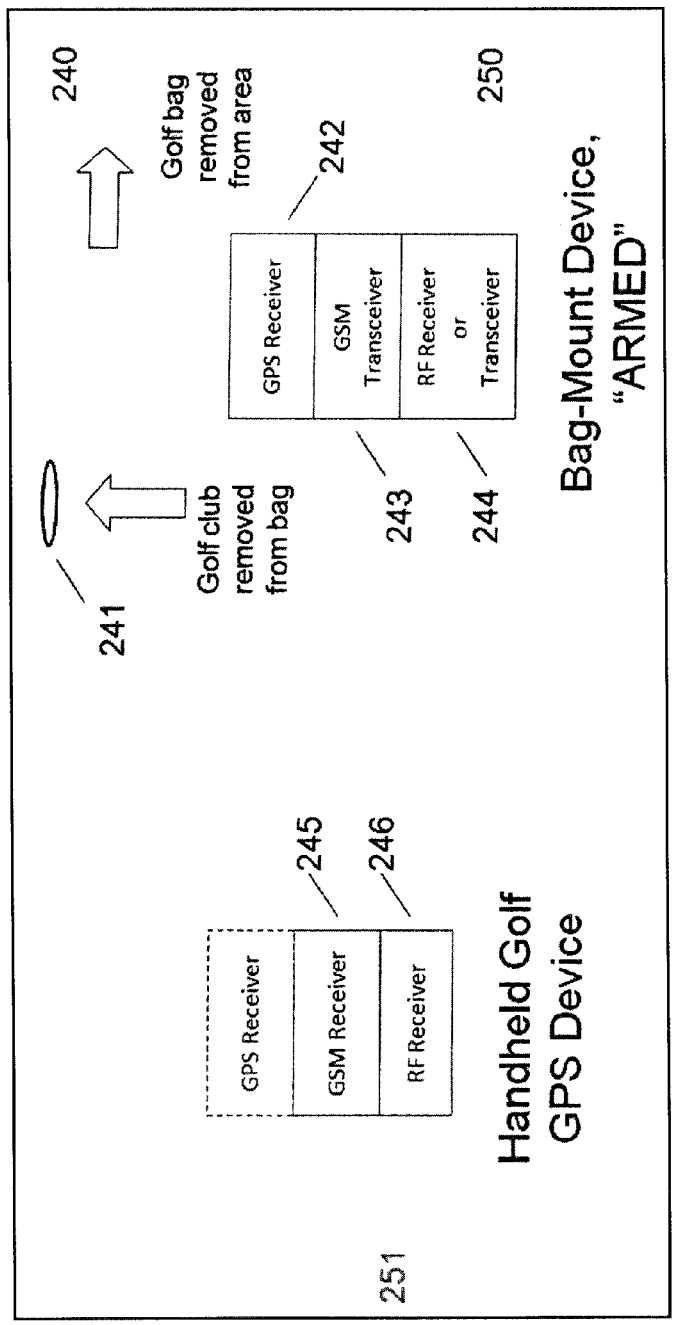
FIG. 24 shows how, in one embodiment, a bag mounted device can optionally be configured to act as a theft alert and prevention system.

This bag-mounted device could optionally be configured to act as a theft prevention system as shown in FIG. 24. The device 251 would include a button called "arm", which the golfer would activate when leaving the golf bag unattended. The device would then be stored in the bag so it is not visible. The device would recognize movement of the bag 240 or a transmission from the club tag 241 that a club has been removed from the bag and issue an alarm. The alarm would be in the form of a transmission to the golf GPS unit 251 carried by the golfer and could be visual information on the golf GPS display, an illuminated or blinking LED, a vibration, or an audio buzzer, or any combination of these. Alternatively, this alarm could be issued by the bag mounted device in the form of an audible alarm which would deter theft. In one embodiment, the bag-mounted device contains a RF receiver or transceiver 244 that transmits the club code information if a club is removed from the bag or transmits an alert if the golf bag is moved. The RF transmission between bag-mount device and GPS golf device can be in one of several allowed frequency bands, such as 433/315 MHz, 800/900 MHz, or 2.4 GHz. Alternatively, when the bag mounted device is put in the "ARM" mode, its LED could blink continuously, indicating that the device is armed. The device could be left in view outside the golf bag with the LED blinking.

In a particular embodiment the bag-mounted device contains a GSM transmitter or transceiver 243 that communicates with a GSM network so that the theft alert can be communicated by cell phone. With the GSM network, the GPS location of the missing golf bag can also be communicated to allow real-time tracking.

Alternatively, a separate receiver for this theft prevention function could be provided that receives this alarm information wirelessly or by GSM network. This receiver would track several devices simultaneously and could be provided to a golf pro shop or restaurant at the golf course.

Figure 25:
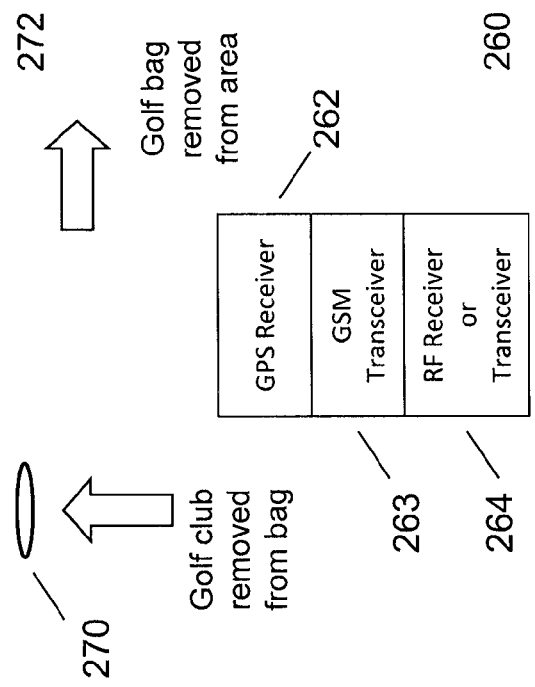
FIG. 25 shows another example of a theft prevention system.

The golf GPS device (e.g. the device shown in FIG. 12) could optionally be configured to act as a theft prevention system as shown in FIG. 25. The device 260 includes a GPS receiver 262 which can, in certain embodiments, be used to allow for golf data collection as described herein; in particular, the GPS receiver 262 can be used to mark the spot of a golf stroke which is indicated by a signal sent from a golf club's tag and received by the RF receiver 264 in the device 260. The RF receiver 264 may, in certain embodiments, also be used as described herein to provide a golf club reminder system. Alternatively, the device 260 may provide only a subset of the functions of golf data collection and golf club reminder system while also providing theft prevention. The device 260 would include a button called "arm", which the golfer would activate when leaving the golf bag unattended. Activating this button puts the device 260 in a theft prevention mode. The device would then be stored in the bag so it is not visible. The device would recognize movement of the bag 272 (e.g. through a motion sensor or through use of the GPS receiver 262) or a transmission from the club tag 270 that a club has been removed from the bag and issue an alarm. In one embodiment, the golf GPS device is equipped with wireless network capability, such as a GSM transceiver 263. The alarm would be in the form of a transmission to the golfer's mobile phone or any phone number specified by the golfer programmed into the golf GPS device. Alternatively, this alarm could be issued by the golf GPS device in the form of an audible alarm which would deter theft. Alternatively, when the golf GPS device is put in the "ARM" mode, its LED could blink continuously, indicating that the device is armed. The device could be left in view outside the golf bag with the LED blinking. In one embodiment, if the golf bag is removed from the area, the golf GPS unit can obtain GPS information using its GPS receiver 262 about the location of the golf bag. This GPS information can be transmitted to the golfer's mobile phone or any phone by wireless network, thereby allowing the device 260 to be tracked in real time.

As shown in FIG. 3C, a photo-sensor 311 and LED 305 are included on the RFID tag 301 in one embodiment. The LED 305 is adjacent to the switch 303 or may be incorporated into the switch. In one embodiment, when the golf club is removed from the bag and exposed to ambient light, the tag transmits its code indicating that the club is out of the bag, and the LED turns on, continuous or blinking. When the golfer presses the switch 303 to record a golf stroke, the LED 305 turns off. This method reminds the golfer to activate the tag before taking a stroke.

In another embodiment, when the golf club is removed from the bag and exposed to ambient light, the tag transmits its code indicating that the club is out of the bag, and the LED is not turned on. The golfer may not require a visible reminder or the golfer may apply reminder "stickers" to the golf club, potentially located just under the grip. When the golfer presses the switch 303 to record a golf stroke, the LED 305 turns on for a short period. This method confirms to the golfer that the button was successfully pressed. Confirmation that the receiving unit received the transmitted code from the golf club tag can be provided on the receiving unit in the form of a visual change to the display, a vibration or an audible alarm.

The LED provides a reminder to the golfer to activate the switch on the tag. The LED turns on or blinks until the golfer activates the switch or until the solar panel is returned to darkness, i.e. when the club is returned to the golf club bag. When the golfer activates the switch, indicating a stroke, the RFID tag electronics turn on. The LED is turned off for a period of time, e.g. 1 minute after activating the switch. This would allow the golfer to take his/her stroke without being distracted by the LED. It also allows the golfer to be reminded with the LED for a stroke immediately following another stroke, such as putts. A golfer may push the switch without the LED reminder. In this case the switch would give the same command: register a stroke, note which club is being used and mark the location.

Alternatively the step of activating the electronics can occur after taking the stroke or at any time while the golfer is close to the location to be recorded.

Optionally, a golfer may wish to deactivate the LED reminder, for example to play a round that is not recorded. The LED may be disabled with a specific series of pressing the switch. For example, the switch may be pushed one short, for example one second, then one long, for example longer than 5 seconds. This command would deactivate the solar panel and control of the LED for a period of time, for example 6 hours. Alternatively, an additional switch could be included on the RFID tag to deactivate the LED. Alternatively, a movable cover may be provided to prevent the solar cell from activation.

Optional embodiments of the RFID tag include:

A "cancel shot" function on the tag would allow the golfer to cancel the last activation of the RFID tag and resultant recording of the handheld receiver. This could be used if the golfer decides to change clubs, for example.

A "penalty shot" function on the tag would allow the golfer to add penalty shots in the case of a lost ball or a provisional shot. The "penalty shot" function might not include location.

These additional functions could be incorporated into an additional switch or a recognized pattern of pressing the single switch. Logic, such as microprocessor 1612 and 1643 in FIGS. 16A and 16B, may decode user activations of a single switch. For example, the "cancel shot" could be accomplished by pressing the switch and holding for a period of time, e.g. 3 seconds; and the "penalty shot" could be accomplished by pressing the switch quickly two times. Each of these switch sequences may occur after a single press of the switch that turns on the tag electronics. Receipt of these commands could by acknowledged by an audio tone emitted from the handheld.

The RF communication between the RFID tag and the handheld is in the 433 MHz frequency band. This provides nearly worldwide wireless compliance. In a particular embodiment, the RFID tag contains a 433 MHz transmitter only, and the handheld contains a 433 MHz receiver only. Alternatively, other frequencies could be used, such as 315 MHz and 2.4 GHz. Alternatively, the RF communication could occur in the 800 or 900 MHz frequency band to use existing RFID technology, such as Alien Technology RFID tags.

Golf course information, such as maps and detailed topography of the golf course, is downloaded from a server to the handheld device. This can be accomplished with an interface to a computer, either by direct connection or by a wireless interface, such as Bluetooth. Alternatively, the handheld may include a wireless interface connected directly to the internet.

The handheld may contain existing golf GPS technology. The present invention incorporates additional functionality in the handheld, which includes a RF receiver, antenna, microprocessor, and power source. The RFID receiver may share some of the circuit elements of the GPS function in the handheld, such as the battery, display, and microprocessor or even further circuit elements. The RF antenna is printed on the existing pc board. In one embodiment, the RF receiver is on when the handheld is on. Alternatively, the RF receiver listens in a low-power mode for a transmitted signal from the RFID tag on the club. When the receiver recognizes a transmitted signal, it turns on continuously for a period of time to capture the entire amount of information from the RFID tag, then returns to low-power listen mode, which would conserve battery power. Each time the switch is activated by the golfer, the RFID tag turns on and transmits club type and a command to mark the location and register a stroke. Similarly, each transition from darkness and light results in a transmission indicating that a club has been removed from or returned to the golf bag.

Upon receipt of the command to "mark-the-spot", the handheld records the location of the GPS receiver (located in the handheld). Ideally, the handheld is worn on the golfer, so the ball location is accurately recorded. Alternatively, the handheld might attach to the golf bag, resulting in a small error in recording the actual location of the ball, the difference between the location of the golf bag (handheld) and the ball.

After each hole the handheld provides the shot information and score to be confirmed so that the golfer can adjust the score as necessary. In one embodiment of the present invention, the display lists each stroke with type of club and distance. The golfer confirms the number of strokes or adjusts the number of strokes as necessary. Optionally, the display shows each shot with distance to the last recorded location. Alternatively, the golfer may choose not to track some individual shots, such as putts, and the handheld would prompt the golfer to enter that amount of strokes at the end of the hole. Information about distances on the golf course would be provided to the golfer. Current technology provided in GPS golf systems includes distance information from the current location to various points on the golf course, such as the hole or hazards.

Shielding techniques, known in the art, may be required to achieve optimum performance of the handheld device. The device contains two or more signal sources operating at different frequencies, for example the clocks or crystals supplying timing for the microprocessors and frequency synthesizers. Furthermore, these signal sources generate additional radio-frequency signals used in the receivers, such as the GPS receiver and the RF receiver. Standard techniques are used to minimize the cross-talk between the various high frequency signals, such as extensive internal ground and power planes in the printed circuit board, filtering with discrete components, such as capacitors and inductors, and metal shields soldered over sensitive circuit elements. Further isolation between circuit elements can be achieved by inserting separate receivers in separate shielded housings or separate compartments of a housing and the use of ferrite beads on cables that enter and exit the housings. The internal dimensions of the housings are less than one-half the wavelength of the highest operating frequency to avoid resonant modes that may couple one or more unwanted frequencies to the frequency of operation.

Additionally, methods of operation can minimize cross-talk, such as timing the operation of the various receivers so that a particular receiver is not on while another receiver is operating. For example, the RF receiver operating at 433 MHz listens for a short period of time, for example 5 milliseconds, and is off for a longer period of time, for example 100 milliseconds. The GPS receive is activated during those periods when the RF receiver is off, for example during the 100 millisecond off period of the RF receiver. Similarly, other functions can be timed in the operation of the system to reduce cross-talk.

The present invention includes RFID tags to be applied to the golfer's clubs. One embodiment of this invention includes a set of 14 RFID tags. The RFID tags are provided with an identification code. In one embodiment of this invention, the RFID tags are supplied with random codes, and the RFID tags are not associated with a particular handheld device. The golfer assigns a name to each club with an initialization process of the handheld device as follows. The device is put in an initialization mode by a command from the user, by pushing a button or selecting from a menu. The handheld indicates that it is ready to initialize a club, by an indication on the display. The golfer holds the RFID tag near the handheld and pushes the button on the RFID tag. The tag turns on and transmits its identification code. The handheld receives this identification code and prompts the golfer to assign a name to this RFID tag (club). The golfer inputs a name for the club by selecting choices on the display. In one embodiment, the handheld offers a list of standard club names from which the golfer can select the desired name. In another embodiment, the handheld offers an alpha-numeric display so that the golfer can spell out the word associated with that particular club. FIG. 18C shows typical set-up of this type of system.

Figure 18B:
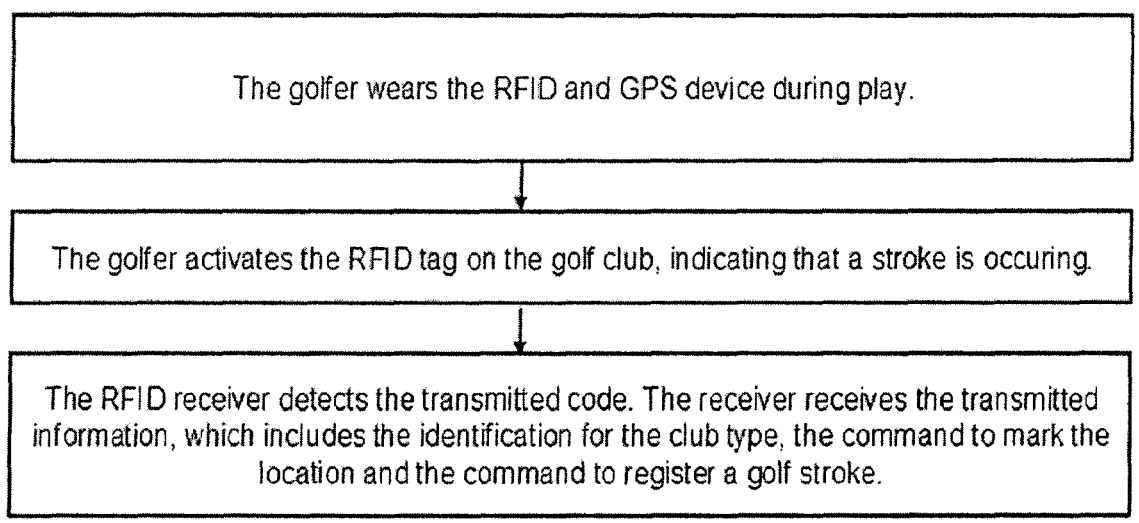
FIG. 18B is a flow chart showing an example of a method for semi-automatically collecting golf data related to the round of golf, such as location of stroke, club used and recording the stroke and score.

Another embodiment of this invention includes a set of 14 RFID tags configured to communicate only with its handheld device, with semi-random identification codes that make the tags unique to their particular handheld device. This would prevent the handheld from incorrectly receiving information from another golfer's club tag. The pack of 14 RFID club tags will include standard identification on each tag, such as "Driver" or "3-Wood" or "7-Iron". These identifiers would be printed on the RFID tag. Optionally the printed identification could be removed from the RFID tag after attachment to the club. The standard identification of the 14 RFID tags would appear as the club identifier in the handheld device. Optionally, the golfer may change the name of the club identifier. For example, if the golfer wishes to label a club "3-Hybrid", he/she may change the standard identifier for "3-Iron" to "3-Hybrid". The golfer would list all registered clubs with their standard identifiers on the handheld display, highlight the identifier that requires change, and edit and save the new information. FIGS. 18A and 18B show flow charts outlining typical set-up and use of the system.

Optionally, additional RFID tags could be provided that require initialization from the handheld device. This initialization process would include using a command on the handheld to initialize additional club tags. The additional tag labeled "Club 1", for example, would be held in proximity to the handheld and powered on. The handheld would receive the information about the tag with the label "Club 1". It would then prompt the golfer to enter another name or accept the given name. In a particular embodiment, all RFID club tags could be provided in this manner, labeled "Club 1", "Club 2", etc., and the golfer would name all the clubs as desired when initializing the club tags.

In an alternative embodiment, the code is programmed to identify a particular club, such as "3-Iron", and is associated with a particular handheld. The system is packaged such that each RFID tag represents a different type of golf club. The RFID tags are initially manufactured with random codes, then renamed during a later manufacturing stage to include the name of the type of club. Alternatively, the RFID tag is programmed with an initial code that would include the name of the type of club. In both of these embodiments, the handheld is programmed to recognize the RFID tags supplied with the handheld device, so there is no initiation process by the golfer. Optionally the golfer may rename any club by performing the initiation process as described previously.

The embodiment of this invention that uses a stand-alone bag-mounted device to perform the missing club function would incorporate a similar initiation process. The device would include a button labeled "learn" or "initiate". The golfer would press this button, the press the golf club tag button. The golf club tag transmits the ID code to the device. The device saves the code and recognizes when this club transmits data pertaining to the club being in or out of the bag.

In one embodiment of this invention, a set of golf club tags is initiated to be recognized by a particular GPS golf system. The bag-mount club inventory device can be configured to recognize the same set of club tags, without the extra steps of initiating each club tag to the device as has already been done with the GPS golf system. The GPS golf system contains the identification code for the golfer's clubs as used in the golf data collection system. The golfer's data can be uploaded to a web site and track and manipulated by the golfer. The golf club tag identification information is also stored on this server. When the golfer wishes to add the bag-mounted device to perform the missing club reminder function, the club identification can be downloaded to the device from the server or web site.

Marking the Location of Each Hole

At the end of a hole the golfer will be prompted to confirm the data collected on the hole. For example, if a golfer scores a "5" on a hole the device's display will show a "5" as the score. In a particular embodiment, the handheld would also display the recorded locations of all five shots. The golfer is presented with "confirm" and "edit" choices. If the golfer chooses to "edit" the score there could be several ways to edit the data. The golfer could potentially delete strokes by selecting the stroke number, then "delete".

If the golfer chooses to "confirm" the score the golfer would then be presented with the option to "mark the hole location" (i.e. "yes" or "no"). If yes, the golfer can capture the distance of the last shot (usually a putt) made. If the golfer selects yes the device would instruct the golfer to hold the handheld device over the hole and select a "mark the spot" command.

The "mark the hole location" function can be a default setting to eliminate the need for additional prompts, per above, during the round of golf. The edit function can consist of "flagging" holes or scores that require editing—to be edited by the golfer at a later time. The golfer may be able to edit the data on the handheld device or after the data has been transferred to another device (e.g. uploaded to a website via the Internet).

A further embodiment of the golf club tag system incorporates a RF transceiver, transmitter and receiver, in both the golf club tag and the GPS golf device. This allows for two-way communication and additional functionality in the system. The additional functions include confirmation that the club tag data has been correctly received and providing a real time check that data has been received. This confirmation would be used with any communication to and from the golf club tag, for initializing the tag to the system, golf data collection, missing club reminder, and theft prevention system.

Interrogation System for Club Reminding.

In another embodiment of the present invention, the club tags can be configured as transceivers to respond to an interrogation signal from another device (e.g. FOB attached to the golf bag). The club tags can be configured to make use of the relaxation oscillator to briefly "listen" for a specific code. When the tags receive the code they can transmit their unique ID code. The club tags can be configured with and on/off switch (e.g. a push button combined with a "flip-flop" latch) to conserve battery power. For example, the club tag can be manufactured and be in an "off" state until the user activates the tag by pushing the button. Once activated the relaxation oscillator can periodically (e.g. every 30 seconds) wake the processor which can instruct the tag transceiver to "listen" briefly for a code. The FOB (attached to the golf bag) can either have a built-in GPS receiver or receive information from a GPS-enabled device (such as a rangefinder) informing the FOB that the location of the GPS receiver suggests that the golfer has just finished a golf hole and is proceeding to the next hole. The FOB, upon receiving this geographic information, could broadcast an interrogation signal to all the golf club tags in the golf bag. This signal can be transmitted with a sufficient length to ensure all the tags receive the interrogation signal. Upon receipt of the interrogation signal the club tags could respond to the FOB and the FOB could report on the status of the club tags based on the club tag response or lack thereof.

Additional Intelligence/Logic

Each club tag will transmit its status (e.g. "in" or "out" of the golf bag) and/or light meter data and therefore the receiving device can keep track of individual club tags based on the received data for each club. The receiving device can use additional logic to potentially warn the golfer of a missing club (or other type of warning). For example, if the golfer removes 3 golf clubs at one time (for example the 6, 7 and 8 iron) the receiving unit will record the time of removal for all three clubs. If two of the clubs are returned to the bag (e.g. the receiving unit receives "in" transmissions from the 6 and 7 iron, but not the 8 iron for some period of time) the receiving unit can warn the golfer that the 8 iron may have been left behind. Further, if the receiving unit has GPS the receiving unit will know, for example, when the golfer is leaving the putting green for one golf hole and moving to the tee box for the next hole. Because the putting green is a common place for clubs to be left behind, the receiving unit can be configured to check if any clubs are still "out" of the golf bag as the golfer leaves one hole and heads to the next. The receiving unit can warn the golfer if any clubs are still "out" based on the geographic information.

It is also contemplated that as a backup or redundant aspect of the club reminder function the tags could, using the relaxation oscillator, transmit their ID code periodically during a round of golf. The tag could be turned on by a validated light meter reading (i.e. confirmed exposure to light for a period of time) then go into a cycle of transmitting its ID code periodically (e.g. once every 5 minutes for 6 hours then shut down). The receiving device could be configured to warn the golfer that a club may be missing if the receiving unit does not receive, for example, 3 consecutive ID code transmissions from a particular club. In other words, if the receiving unit does not hear from the "putter" for 15 minutes (3 cycles of 5 minutes) it could warn the golfer that the putter may have been left behind.

Inhibitor Based Approaches

Active golf club tags with a relaxation oscillator allow for many potential configurations of a golf club reminding and/or data collection system. It is contemplated that a device attached in some manner to or in a golf bag (referred to herein as a "FOB") could serve as a device that "inhibits" the tags from transmitting. This inhibiting approach is contemplated as a way to conserve battery life on the club tags and to minimize potential club tag transmission collisions. In these inhibitor-based approaches the relaxation oscillator allows for a very low power means of continually "checking" whether the club tags are in the proximity of the FOB or not.

Magnetic Inhibitor. One approach is to use a magnet at the bottom of a golf bag as part of the FOB and magnetic sensors in the club tags. Once the tag is activated (e.g. from one of the switching means discussed herein) the relaxation oscillator can have the club tag periodically wake up and take a magnetic field strength reading. This could happen frequently (e.g. every 4 seconds). If the club tag senses the presence of a magnet it assumes it is in the bag and does not transmit its code. If the club tag wakes up and does not sense the presence of the magnet it assumes it is out of the bag and transmits its code. The "out of bag" transmissions can be repeated as discussed herein and upon sensing the magnetic field again the tag could transmit that it is back "in the bag".

RF Pulse Inhibitor. The FOB can transmit a periodic RF pulse and the tag can be configured with a diode that can be rectified by the FOB's RF pulse, waking up the tag. The diode in the tag is illuminated with signal to rectify it ("turn it on"). Depending on the application, when the diode is rectified, a portion of the circuit is turned on. For simplicity the illuminator circuit and its housing could be referred to as the "FOB". The FOB sends a signal every 5 seconds, for example. The FOB could be positioned in an outer bottom compartment of the golf bag.

RF Pulse—Technique A

When illuminated, tag turns on but DOES NOT transmit its ID and "out of bag" status for 6 seconds and DOES NOT transmit tag ID and "out of bag" status if tag is illuminated again before 6 seconds.

If no next illumination is received within 6 seconds, tag transmits its ID and "out of bag". Continues transmitting its ID and "out" status every 30 seconds for up to ten transmissions (5 minutes), then shuts down. Tag remembers that its last transmission was an "out of bag" transmission.

If illuminated again tag last transmission was "out", tag transmits its ID and that tag is "in the bag".

A relaxation oscillator is used to hold the PIC (processor) in the OFF state. The oscillator's natural repetition rate is 6 seconds, but it is reset by a pulse detected by the antenna. When the club tag is within range of the FOB, it continues to receive this "reset" pulse every 5 seconds. When the club tag is out of range (out of the bag), 6 seconds elapses without a new pulse, and the relaxation oscillator reaches its natural reset state and turns the PIC ON. Tag transmits "out of bag".

RF Pulse—Technique B

Tags are illuminated every 5 seconds.

When illuminated, tag turns on and transmits its ID and "in the bag" status once, then turns off.

If no message received, it is assumed that club is out of bag—club has been removed from bag and is out of range. It is no longer receiving the illumination signal. Diode turns itself off when illuminating signal goes away, so PIC returns to off, ready to receive next ON signal from diode. Triggering the PIC to be on or off can occur as a change to an input pin on the PIC.

RF Pulse—Technique C. When illuminated, tag turns on and transmits its ID and "in the bag" status once (for example, two bursts, 62.5 msec each=125 msec), then turns off. This technique is used as a polling technique to obtain an initial count of golf clubs in a bag. It is used at the beginning of a round of golf and can be manually initiated by the golfer in the FOB or rangefinder or automatically initiated by the rangefinder.

Ultrasonic Inhibitor. Similar to the other inhibitor-based approaches, the FOB produces an ultrasonic field (e.g. 40 KHz) and the club tags are configured with ultrasonic receivers. Again, at a periodic interval driven by the relaxation oscillator, the tags could "listen" for the ultrasonic signal. If the tag detects the ultrasonic signal the tag is "in the bag" and does not transmit. If the tag does not detect the ultrasonic signal it is "out of the bag" and transmits its code in a similar manner as described herein.

Physical Embodiments

Figure 6:
FIG. 6 shows a configuration of the apparatus where the GPS receiver and RFID transceiver are in the same housing and worn on the belt or in the front pocket while golfing.

Option 1—GPS & RFID Transceiver all in One Housing; See FIG. 6

The hardware and electronics required to communicate with the club tags are included in the GPS handheld device. The device is worn on the golfer's belt or kept in the golfer's front pocket. In a preferred embodiment the device also has broadband Internet connectivity—allowing for on-the-fly downloading of golf course maps and uploading of data collected after a round of golf.

Figure 7:
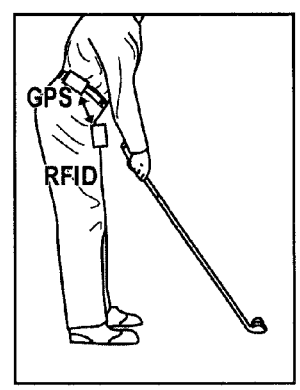
FIG. 7 shows a configuration of the apparatus where the GPS receiver and RFID transceiver are in separate housings and communicate with each other via wireless communication (e.g. Bluetooth). The housings can be worn on the belt or in the front pocket while golfing.

Option 2—RFID Transceiver in a Separate Housing (See Example Shown in FIG. 7)

This option may be easier to manufacture (e.g. less shielding requirements), but would require the golfer to wear two devices while golfing.

The hardware and electronics required to communicate with the club tags are included in a housing (separate from the GPS device housing). The RFID device is worn on the golfer's belt or kept in the golfer's front pocket and communicates with the GPS device—also worn on the belt or in the pocket—wirelessly (e.g. via Bluetooth or similar). In a preferred embodiment the GPS device also has broadband Internet connectivity—allowing for on-the-fly downloading of golf course maps and uploading of data collected after a round of golf.

Figure 8:
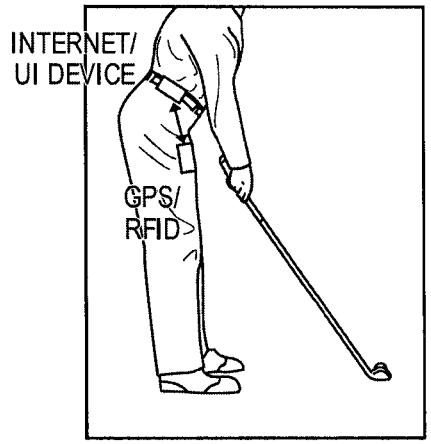
FIG. 8 shows a configuration of the apparatus where the GPS receiver and RFID transceiver are in one housing and communicate with an Internet device (e.g. cell phone) via wireless communication (e.g. Bluetooth). The housings can be worn on the belt or in the front pocket while golfing. The Internet device can be clipped to the golfer's golf bag or cart to minimize the size of what is worn.

Option 3—RFID Transceiver & GPS in One Housing and Wireless Internet and User Interface Device (e.g. Cell Phone) in a Separate Housing This option, an example of which is shown in FIG. 8, may be easier to manufacture (e.g. less shielding requirements). This embodiment will allow the golfer the flexibility of wearing the Internet device (e.g. cell phone) while golfing or not. If the golfer prefers to not wear the cell phone during play, the data could be recorded by the GPS/RFID device and automatically sent to the cell phone when in close proximity via wireless communication (e.g. Bluetooth). For example, the golfer could keep the cell phone in the golf cart. When the golfer returns to the cart after each shot the data would be sent to the cell phone via Bluetooth.

The GPS receiver and the hardware and electronics required to communicate with the club tags are included in a housing (separate from the cell phone housing). The GPS/RFID device is worn on the golfer's belt or kept in the golfer's front pocket and communicates with the cell phone wirelessly (e.g. via Bluetooth or similar).

Figure 9:
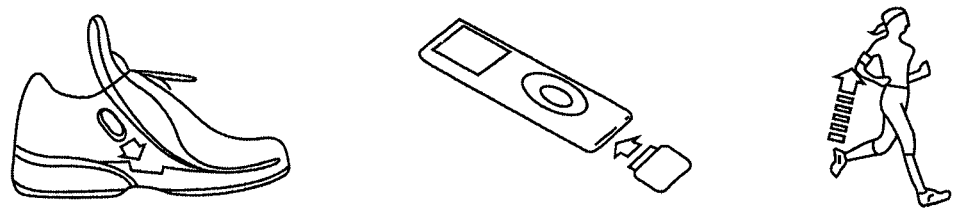
FIG. 9 shows an example of an existing apparatus designed to fit inside a shoe and communicate wirelessly to another apparatus worn on the body during a sporting activity. The apparatus for the present invention (i.e. the RFID transceiver and/or GPS receiver) can be designed to fit inside a golf shoe in a similar manner.
Figure 10:
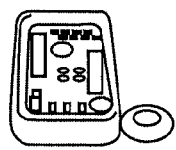
FIG. 10 shows the size of an existing GPS receiver designed to fit inside a shoe.
Figure 11:
FIG. 11 shows an existing design for a GPS receiver built into a running shoe.

An alternative embodiment is to provide the GPS/RFID device as a module to be incorporated into the shoe, as shown in FIGS. 9, 10, and 11. See also examples of Nike+iPod running shoes with electronics inserts and GTXC GPS enabled shoes (FIG. 9). This device could be worn on the shoe or potentially built-in to clothing or equipment, for example manufactured into golf shoes or a hat. An embodiment of this option allows the golfer to not wear the Internet device during play.

Alternate Golf Course Mapping Technique

Figure 13:
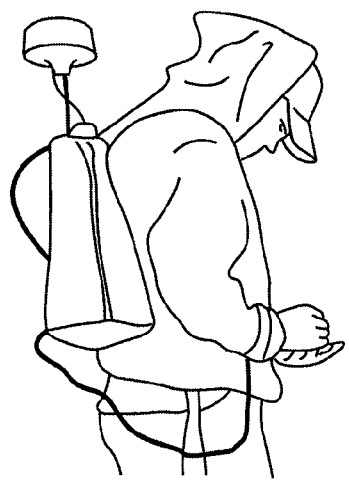
FIG. 13 shows a back pack mounted GPS receiver used by people to map golf courses.

Existing GPS companies (i.e. Golflogix and SkyCaddie) use people to map golf courses. The person mapping the course wears a backpack GPS receiver or one of the handheld products themselves (e.g. the SkyCaddie). See FIGS. 12 and 13.

This method is effective but the accuracy depends on the quality of job being performed by the mapper. For example, individual golfers can map their own courses and upload the data to sites such as SkyGolf.com. However, it is difficult for SkyGolf to know how accurate the data is. Therefore SkyGolf employs workers and trains them how to accurately map the courses. This is a very time-consuming and expensive endeavor as there are many points of interest to map on the golf course.

A more efficient method of mapping golf courses is described herein. Using overhead photography or satellite imagery (e.g. Google Maps) one could use a computer and a minimal amount of mapped points on a golf course to provide complete golf course map data.

Figure 14:
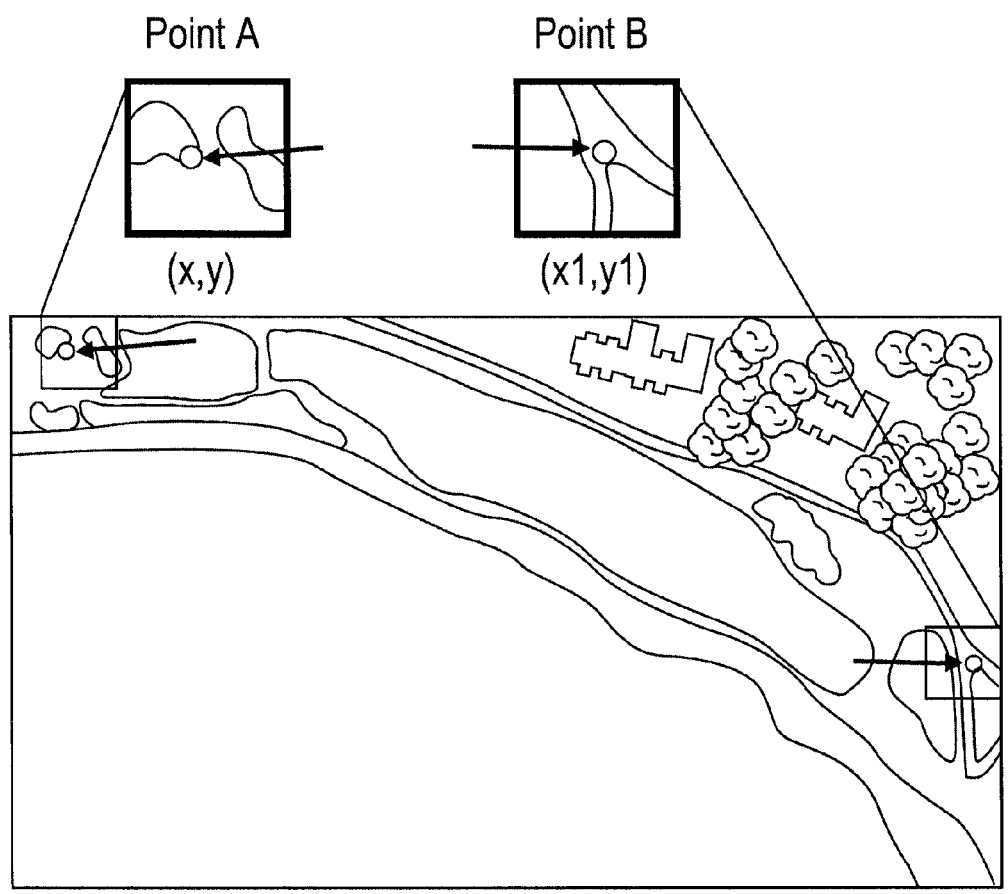
FIG. 14 shows two points on a golf course hole. These two points can be identified on a satellite image of the golf course hole and on the golf course hole itself. A person could confirm the X, Y, Z coordinates of the two points with a GPS receiver and adjust a satellite image's coordinates to match.
Figure 15:
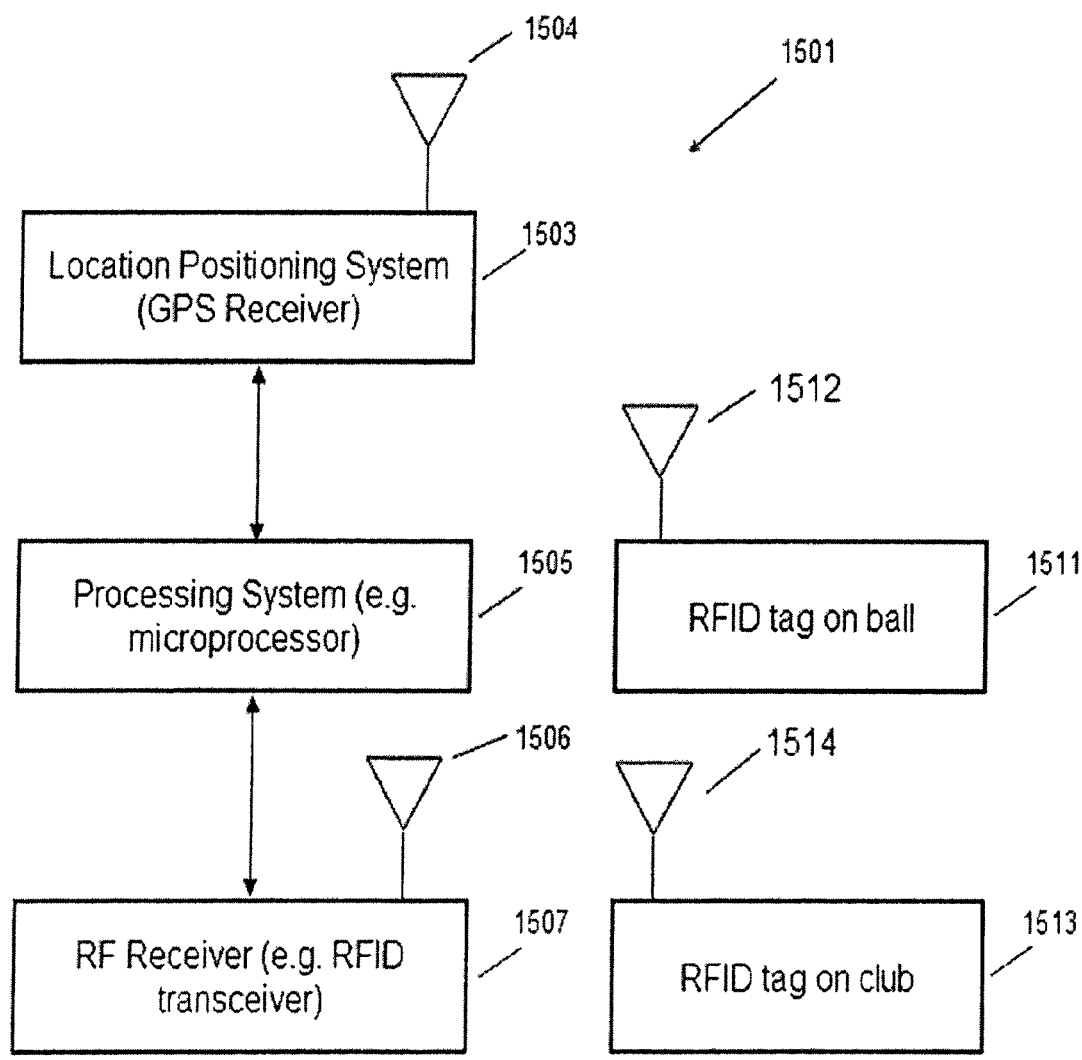
FIG. 15 shows an example of a location positioning system and an RF receiver system which can semi-automatically cause the collection of data about a golf stroke and data about a club being in or out of the golf bag.

Satellite images of golf courses are relatively accurate but not exact. Satellite imagery (e.g. Google Earth) can contain X, Y & Z coordinates. The two dimensional photographs are layered with earth contours to create accurate three dimensional depictions of the earth. See FIG. 14.

If one was to take data from Google Earth for example and physically record a small number of positions at a golf course (i.e. 5-20 positions) the Google Earth map could be mathematically manipulated so that the 5-10 points taken at the course match exactly with the Google Map data. From there, the balance of the points of interest could be determined virtually—on the computer. This would save huge amounts of time and expense in physically mapping all points of interest on golf courses.

Alternatively the satellite images could be adjusted for accuracy by aligning easily identifiable satellite image features with known coordinates from a GPS mapped golf course, for example as created by SkyGolf.

While a GPS receiver has been described as an example of a positioning system, other positioning systems can alternatively be used, such as other satellite positioning systems or systems which use cellular telephone towers or basestations or pseudolites.

What is claimed is:

1. A golf club component adapted to be coupled to a golf club, the golf club component comprising:
    a first light sensor, a second light sensor and a radio frequency (RF) transmitter coupled to a golf club;
    wherein:
    the first light sensor which has an output;
    the second light sensor configured to take one or more measurements of light intensity in response to a change of state of the output of the first light sensor, wherein the change of state of the output of the first light sensor causes the second light sensor to be activated; and
    the radio frequency (RF) transmitter coupled to the second light sensor, the RF transmitter being configured to transmit a first signal indicating that the golf club has been removed from a golf bag, and the RF transmitter being configured to transmit a second signal indicating that the golf club has been replaced into the golf bag, and wherein the first signal is transmitted in response to one or more light measurements from the second light sensor and the second signal is transmitted in response to one or more light measurements from the second light sensor.

2. The golf club component as in claim 1 wherein the golf club component is adapted to be attached to a grip of the golf club and wherein the golf club component further comprises:
    a battery;
    a logic circuit coupled to the battery and coupled to the first light sensor and coupled to the second light sensor and coupled to the RF transmitter, the logic circuit being configured to cause the RF transmitter to transmit the first signal and the second signal and wherein the first signal is different than the second signal.

3. The golf club component as in claim 2 wherein:
    the second light sensor is configured to measure a light intensity and to provide the one or more measurements of light intensity to the logic circuit; wherein:
    the logic circuit is configured to control the RF transmitter and configured to process the one or more measurements to determine whether to cause the RF transmitter to transmit the first signal and the second signal and wherein the logic circuit is configured to change the power consumption state of the logic circuit and the second light sensor and the RF transmitter in response to the change of state of the output of the first light sensor.

4. The golf club component as in claim 3, wherein the golf club component has a first golf club component power consumption state and a second golf club component power consumption state, and wherein:
    in the first golf club component power consumption state, the first light sensor consumes power to detect a change of light and the logic circuit consumes power in a first logic circuit power consumption state in order to process and respond to the change of state of the output of the first light sensor, and the second light sensor consumes power in a first second light sensor power consumption state, and the RF transmitter consumes power in a first RF transmitter power consumption state; and wherein:
    in the second golf club component power consumption state, the second light sensor consumes power in a second light sensor power consumption state, which consumes more power than the first second light sensor power consumption state, and the RF transmitter consumes power in a second RF transmitter power consumption state, which consumes more power than the first RF transmitter power consumption state and the logic circuit consumes power in a second logic circuit power consumption state, which consumes more power than the first logic circuit power consumption state, in order to process the one or more measurements.

5. The golf club component as in claim 4, wherein the RF transmitter in the first RF transmitter power consumption state consumes substantially no power and wherein the logic circuit comprises a microprocessor and wherein the golf club component is adapted to be attached to the top of the grip; and wherein the microprocessor causes the second light sensor to return to the first second light sensor power consumption state and causes the RF transmitter to return to the first RF transmitter power consumption state and causes the microprocessor to return to the first logic circuit power consumption state after a period of time after the change of state of the output of the first light sensor.

6. The golf club component as in claim 5 wherein the golf club component is configured so that the first light sensor provides a first sensitivity to light and the second light sensor provides a second sensitivity to light, the first sensitivity to light being more sensitive than the second sensitivity to light and wherein the first signal and the second signal include a unique identifier of the golf club relative to at least a set of other golf clubs of a golfer, and wherein the golf club component comprises memory, coupled to the microprocessor, for storing the unique identifier and wherein the first signal indicates a state to cause a timer to start in a device that receives the first signal and wherein the second signal indicates a state to cause the timer to stop.

7. The golf club component as in claim 6 wherein the microprocessor is configured to cause the second light sensor to make a plurality of measurements over a period of time and wherein the microprocessor is configured to process the plurality of measurements to determine whether to cause the transmitter to transmit the first signal and the second signal.

8. The golf club component as in claim 6, wherein the microprocessor is configured to cause the RF transmitter to transmit data representing the one or more measurements of light intensity provided by the second light sensor to a mobile device which provides a message to a golfer that the golf club is not in the golf bag.

9. A golf club component, adapted to be coupled to a golf club, the golf club component comprising:
the golf component coupled to a golf club;
a first light sensor which has an output;
a second light sensor configured to take one or more measurements of light intensity in response to a change of state of the output of the first light sensor, wherein the change of state of the output of the first light sensor causes the second light sensor to be activated;
a logic circuit coupled to the first light sensor to receive the output and coupled to the second light sensor;
an RF transmitter coupled to the logic circuit;
a timer circuit coupled to the logic circuit, the timer circuit being configured to cause the logic circuit to repeatedly cause the RF transmitter to transmit a first signal indicating that the golf club has been removed from a golf bag, and wherein the logic circuit is configured to cause the RF transmitter to transmit a second signal indicating that the golf club has been replaced into the golf bag, and wherein the first signal is transmitted in response to one or more light measurements from the second light sensor and the second signal is transmitted in response to one or more light measurements from the second light sensor.

10. The golf club component as in claim 9 wherein the timer circuit and the logic circuit are fabricated on the same integrated circuit and wherein the signal includes a unique identifier of the golf club relative to other golf clubs in the golf bag.

11. The golf club component as in claim 9 wherein the logic circuit comprises a microprocessor and the timer circuit comprises a relaxation oscillator.

12. The golf club component as in claim 9 further comprising a battery coupled to the logic circuit and wherein the logic circuit comprises a microprocessor and the timer circuit provides a series, over time, of timed signals to the microprocessor, each of the timed signals causing the microprocessor to obtain a measurement of light intensity from the second light sensor and wherein the microprocessor processes a plurality of the measurements of light intensity from the second light sensor to determine whether to cause the RF transmitter to transmit the first signal.

13. The golf club component as in claim 12 wherein the timer circuit is configured to cause the microprocessor to cause the RF transmitter to transmit the second signal a plurality of times, and wherein the first signal comprises a unique identifier, relative to the other golf clubs in the golf bag, which identifies the golf club which has been removed from the golf bag.

14. The golf club component as in claim 9 further comprising:
a battery coupled to the logic circuit; and wherein
the second light sensor is configured to measure a light intensity and to provide a plurality of measurements of light intensity to the logic circuit, and wherein the timer circuit is configured to cause the logic circuit to obtain each of the plurality of measurements of light intensity in response to a signal from the timer circuit, and wherein a signal from the output of the first light sensor causes the logic circuit to begin to obtain the plurality of measurements of light intensity, and wherein the logic circuit processes the plurality of measurements of light intensity from the second light sensor to determine whether to cause the RF transmitter to transmit the first signal and the second signal.

15. The golf club component as in claim 14 wherein the timer circuit is configured to cause the logic circuit to cause the RF transmitter to transmit the second signal a plurality of times, and wherein the first signal comprises a unique identifier, relative to other golf clubs in the golf bag, which identifies the golf club which has been removed from the golf bag and wherein the golf club component comprises a memory, coupled to the logic circuit, for storing the unique identifier.

16. The golf club component as in claim 15 wherein the signal from the output of the first light sensor causes the logic circuit to exit a low power mode and causes the logic circuit to cause the timer circuit, the second light sensor, and the RF transmitter to exit a low power mode and wherein the logic circuit causes, after a period of time after the signal from the output of the first light sensor, the RF transmitter, the second light sensor and the timer circuit to enter the low power mode, and wherein the golf club component is adapted to be attached to the top of a grip of the golf club, and wherein the golf club component is configured so that the first light sensor provides a first sensitivity to light and the second light sensor provides a second sensitivity to light and the first sensitivity to light being more sensitive than the second sensitivity to light.

17. The golf club component as in claim 16 wherein the logic circuit is configured to cause the RF transmitter to transmit data, representing the plurality of measurements of light intensity provided by the second light sensor, to a mobile device which provides a message to a golfer that the golf club is not in the golf bag.

* * * * *